US012608830B2

(12) United States Patent
Unger et al.

(10) Patent No.: US 12,608,830 B2
(45) Date of Patent: Apr. 21, 2026

(54) DISTANCE ESTIMATION USING A GEOMETRICAL DISTANCE AWARE MACHINE LEARNING MODEL

(71) Applicant: QUALCOMM Incorporated, San Diego, CA (US)

(72) Inventors: David Unger, Stuttgart (DE); Senthil Kumar Yogamani, Headford (IE); Varun Ravi Kumar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 606 days.

(21) Appl. No.: 17/933,756

(22) Filed: Sep. 20, 2022

(65) Prior Publication Data

US 2024/0095937 A1 Mar. 21, 2024

(51) Int. Cl.
*G06T 7/50* (2017.01)
*G06T 7/168* (2017.01)

(52) U.S. Cl.
CPC ............... *G06T 7/50* (2017.01); *G06T 7/168* (2017.01); *G06T 2207/10028* (2013.01); *G06T 2207/20081* (2013.01)

(58) Field of Classification Search
CPC . G06T 7/50; G06T 7/168; G06T 2207/10028; G06T 2207/20081; G06T 2207/10016; G06T 2207/20084; G06T 2207/30261
See application file for complete search history.

(56) References Cited

U.S. PATENT DOCUMENTS

| | | | | |
|---|---|---|---|---|
| 11,308,338 B2 * | 4/2022 | Yang | ..................... | G01S 15/931 |
| 11,701,996 B2 | 7/2023 | Zhou et al. | | |
| 2021/0183088 A1 * | 6/2021 | Gallo | .................. | G06N 3/0464 |
| 2021/0406679 A1 | 12/2021 | Wen et al. | | |

(Continued)

OTHER PUBLICATIONS

Barea R., et al., "Integrating State-of-the-art CNNs for Multi-Sensor 3D Vehicle Detection in Real Autonomous Driving Environments", 2019 IEEE Intelligent Transportation Systems Conference (ITSC), IEEE, Oct. 27, 2019, pp. 1425-1431, XP033668320, Abstract, Figure 1 Sections "III.A. ERFNet-YOLOv3-based Framework", "IV.F. Comparison of the New Framework Proposals", "IV.A. Kitti Benchmark".

(Continued)

*Primary Examiner* — Stephen R Koziol
*Assistant Examiner* — Dylan J Sherrillo
(74) *Attorney, Agent, or Firm* — Polsinelli LLP/QUALCOMM Incorporated

(57) ABSTRACT

Techniques and systems are provided for generating depth information for an image. For instance, a process can include obtaining one or more images of an environment. The process can further include generating a set of features for the one or more images. The process can also include combining the set of features with one or more distance maps to generate combined feature distance information, wherein the one or more distance maps indicate distances based on relative height above a ground level. The process can further include generating depth information of the environment based on the combined feature distance information, and outputting the depth information of the environment.

30 Claims, 13 Drawing Sheets

(56) References Cited

U.S. PATENT DOCUMENTS

2022/0180549 A1*   6/2022  Jing ....................... G06V 10/82
2022/0189054 A1    6/2022  Kaiser et al.
2022/0415059 A1*  12/2022  Smolyanskiy ..... B60W 60/0011
2023/0071437 A1    3/2023  Kim et al.

OTHER PUBLICATIONS

International Search Report and Written Opinion—PCT/US2023/071142—ISA/EPO—Nov. 7, 2023.
Ku J., et al., "Joint 3D Proposal Generation and Object Detection from View Aggregation", 2018 IEEE/RSJ International Conference on Intelligent Robots and Systems (IROS), Oct. 1, 2018, 8 Pages, XP055657323, Abstract Sections "I. Introduction", "III.A. Generating FEature Maps from Point Clouds and Images", "IV. Experiments and Results".

* cited by examiner

302

FULLY CONNECTED

304

LOCALLY CONNECTED

310

312

314

316

306

CONVOLUTIONAL

308

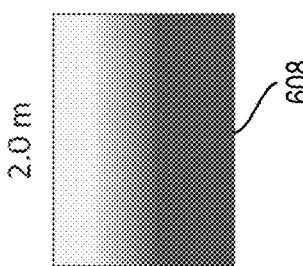
2.0 m
608
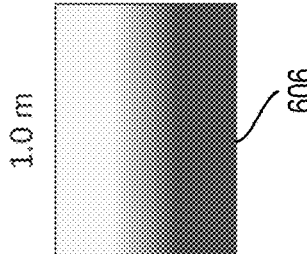
1.0 m
606
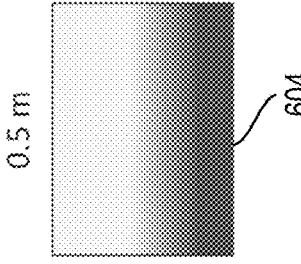
0.5 m
604
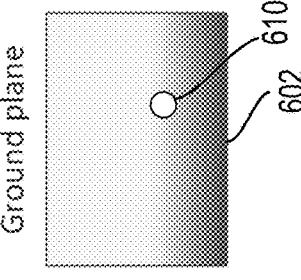
Ground plane
610
602
Distance above ground plane:
Depth/distance map
for this plane:
600
FIG. 6

800

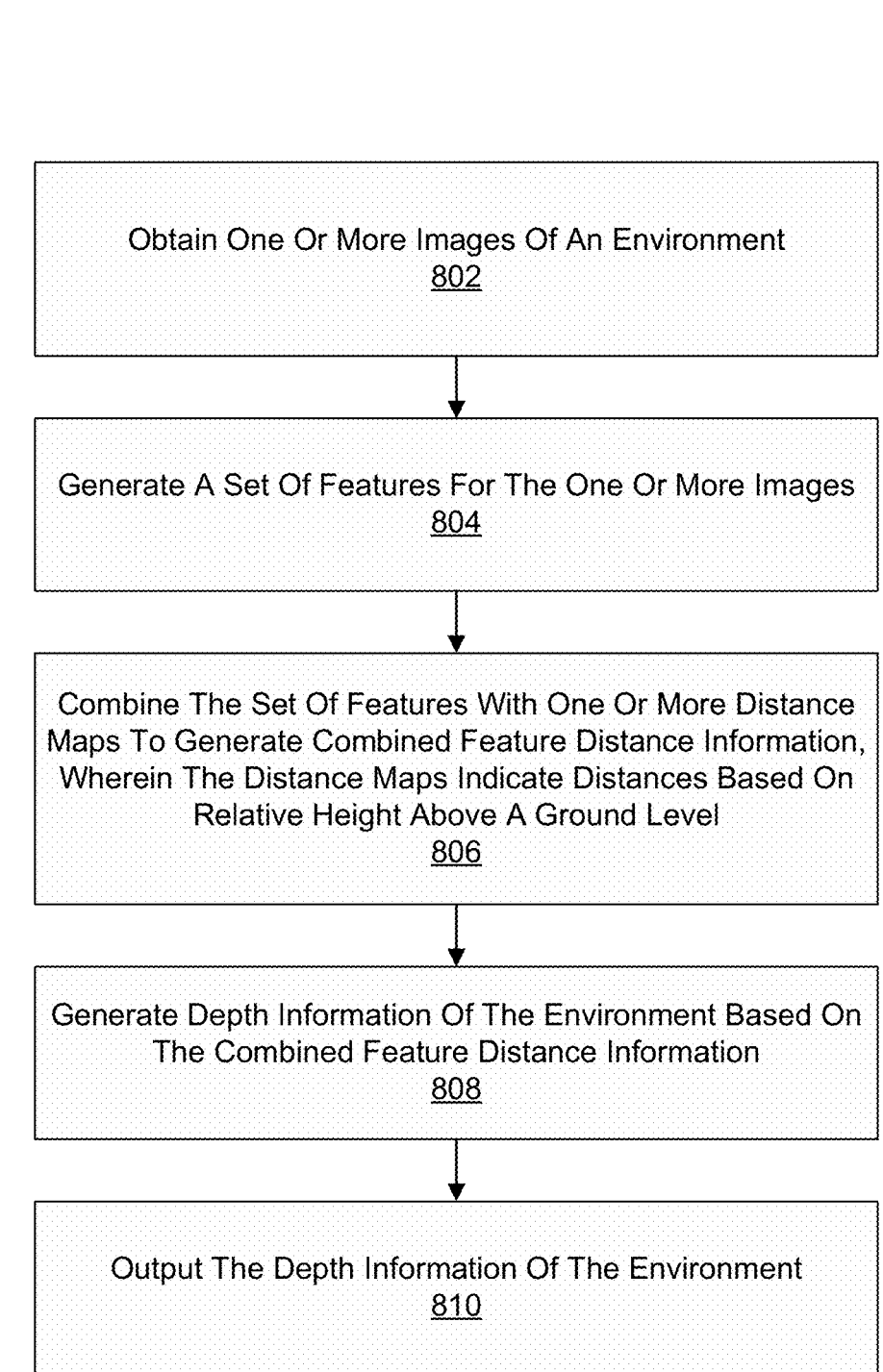

Obtain One Or More Images Of An Environment
802

Generate A Set Of Features For The One Or More Images
804

Combine The Set Of Features With One Or More Distance Maps To Generate Combined Feature Distance Information, Wherein The Distance Maps Indicate Distances Based On Relative Height Above A Ground Level
806

Generate Depth Information Of The Environment Based On The Combined Feature Distance Information
808

Output The Depth Information Of The Environment
810

FIG. 8

DISTANCE ESTIMATION USING A GEOMETRICAL DISTANCE AWARE MACHINE LEARNING MODEL

FIELD

The present disclosure generally relates to object localization and more specifically, to techniques, systems, and methods for improved localization using a geometrical distance aware machine learning model.

BACKGROUND

Increasingly, systems and devices (e.g., autonomous vehicles, such as autonomous and semi-autonomous cars, drones, mobile robots, mobile devices, extended reality (XR) devices, and other suitable systems or devices) include multiple sensors to gather information about the environment, as well as processing systems to process the information gathered, such as for route planning, navigation, collision avoidance, etc. One example of such a system is an Advanced Driver Assistance System (ADAS) for a vehicle. Sensor data, such as images captured from one or more cameras, may be gathered, transformed, and analyzed to detect objects. One example of a transformed view or model is a semantically segmented birds-eye-view (BEV) (e.g., a top-down view) of the environment.

Generating a semantically segmented BEV may be useful for many applications and systems, including XR (e.g., augmented reality (AR), virtual reality (VR), mixed reality (MR)), robotic systems, manufacturing systems, quality assurance, automotive and aviation (e.g., manufacturing, autonomous driving or navigation, etc.), three-dimensional scene understanding, object grasping, object tracking, video analytics, security systems, among many others. For instance, the semantically segmented BEV may include an image where each pixel of the image is labeled according to an object category to predict objects in the view. The semantically segmented BEV can facilitate effective operation of various systems.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

In one illustrative example, an apparatus for generating depth information is provided. The apparatus comprising at least one memory comprising instructions and at least one processor coupled to the at least one memory. The at least one processor is configured to: obtain one or more images of an environment; generate a set of features for the one or more images; combine the set of features with one or more distance maps to generate combined feature distance information, wherein the one or more distance maps indicate distances based on relative height above a ground level; generate depth information of the environment based on the combined feature distance information; and output the depth information of the environment.

In another example, a method for generating depth information, comprising: obtaining one or more images of an environment; generating a set of features for the one or more images; combining the set of features with one or more distance maps to generate combined feature distance information, wherein the one or more distance maps indicate distances based on relative height above a ground level; generating depth information of the environment based on the combined feature distance information; and outputting the depth information of the environment.

As another example, a non-transitory computer-readable medium having stored thereon instructions that, when executed by one or more processors, cause the at least one or more processors to: obtain one or more images of an environment; generate a set of features for the one or more images; combine the set of features with one or more distance maps to generate combined feature distance information, wherein the one or more distance maps indicate distances based on relative height above a ground level; generate depth information of the environment based on the combined feature distance information; and output the depth information of the environment.

In another example, an apparatus for generating depth information comprising: means for obtaining one or more images of an environment; means for generating a set of features for the one or more images; means for combining the set of features with one or more distance maps to generate combined feature distance information, wherein the one or more distance maps indicate distances based on relative height above a ground level; means for generating depth information of the environment based on the combined feature distance information; and means for outputting the depth information of the environment. In some cases, the apparatus may further include means for performing a transformation operation based on the depth information of the environment and the set of features to generate a transformed set of features; and means for outputting the transformed set of features, wherein the depth information of the environment is output implicitly in the transformed set of features.

In some aspects, the apparatus is, is part of, and/or includes a vehicle or a computing device or component of a vehicle (e.g., an autonomous vehicle), a camera, a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 6 illustrates a set of distance map images based on known camera properties, in accordance with aspects of the present disclosure;

FIG. 8 is a flow diagram illustrating an example of a process for generating one or more depth maps, in accordance with aspects of the present disclosure;

DETAILED DESCRIPTION

Figures 1A, 1B:
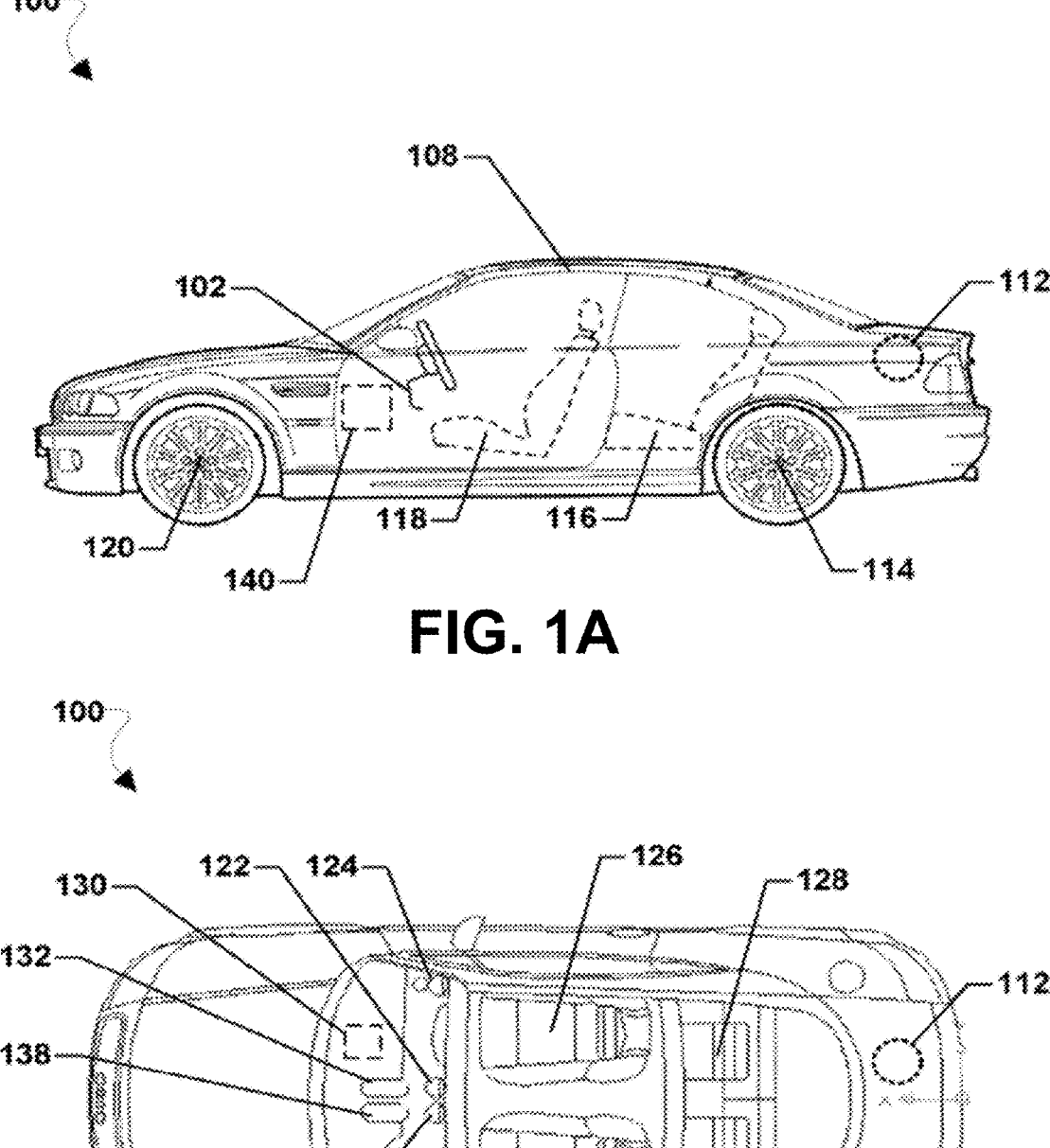
FIGS. 1A and 1B are block diagrams illustrating a vehicle suitable for implementing various techniques described herein, in accordance with aspects of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

As noted previously, one or more sensors (e.g., image sensors, such as a camera, range sensors such as radar and/or light detection and ranging (LIDAR) sensors, etc.) of a device or system may be used to obtain information about an environment in which the device or system is located. A processing system of the device or system may be used to process the information for one or more operations, such as route planning, navigation, collision avoidance, among others. For example, in some cases, the sensor data may be obtained from the one or more sensor (e.g., one or more images captured from one or more cameras, depth information captured or determined by one or more radar and/or LIDAR sensors, etc.), transformed, and analyzed to detect objects.

One example of a transformed view or model is a semantically segmented birds-eye-view (BEV) (e.g., a top-down view) of the environment. In the semantically segmented BEV, each pixel corresponds to a grid cell in the real world (e.g., the imaged environment). A value may be assigned to each pixel and this value corresponds to a category (e.g., group) representing real-world content at the corresponding position. The semantically segmented BEV may be created by generating features from images and then transforming those generated features into BEV space. These features in the transformed space may then be further processed, for example by machine learning (ML) models, to obtain the semantically segmented BEV information. In some cases, 3D object detection may be performed in parallel or instead the semantically segmented BEV.

Generating a semantically segmented BEV may be useful for many applications and systems, including XR applications (e.g., AR systems, VR systems, MR systems, etc.), robotic systems, manufacturing systems, quality assurance, manufacturing, autonomous driving or navigation, three-dimensional (3D) scene understanding, object grasping, object tracking, video analytics, security systems, among others. For instance, the semantically segmented BEV may include an image where each pixel of the image is labeled according to an object category to predict objects in the view. The semantically segmented BEV can facilitate effective operation of various systems. In an illustrative example, an autonomous vehicle can use a BEV representation of an environment around the autonomous vehicle to navigate through traffic.

The exact localisation of any object in a BEV image and for 3D object detection from monocular images are non-trivial and challenging tasks (e.g., in computer vision). Such a problem can be challenging, at least in part, because camera images do not contain accurate depth information. Accurately determining positions or locations of detected objects can be useful for the various applications and systems noted above, such as autonomous vehicle perception, XR applications, etc. For instance, BEV segmentation and 3D object detection can both be useful for autonomous vehicle guidance. Both tasks may require a 3D perception of the world, which can be challenging with a set of monocular cameras which capture a two-dimensional (2D) projection of the 3D world. Existing solutions for distance estimation often employ multiple sensors, such as radar sensors, LIDAR sensors, or multiple cameras. A technique for implicit or explicit distance estimation that reduces or eliminates a need for multiple sensors may be useful.

Systems, apparatuses, electronic devices, methods (also referred to as processes), and computer-readable media (collectively referred to herein as "systems and techniques") are described for providing (and training) a machine learning based algorithm for using geometrical priors to accurately estimate a depth from images from a monocular camera. The implicit depth information of an image may be used to generate explicit depth information, for example using an ML model, to improve localization accuracy, which usually degrades with the distance of the object from the sensor.

The systems and techniques describe herein can be used to improve the localization accuracy for various applications and systems, including autonomous driving, XR systems, robotics, scene understanding, among others. Higher accuracy for computer vision tasks can be implemented to replace expensive sensors (e.g., LIDAR sensors), which can lead to a large cost benefit.

Various aspects of the application will be described with respect to the figures.

The systems and techniques described herein may be implemented by any type of system or device. One illustrative example of a system that can be used to implement the systems and techniques described herein is a vehicle (e.g., an autonomous or semi-autonomous vehicle) or a system or component (e.g., an ADAS or other system or component) of the vehicle. FIGS. 1A and 1B are diagrams illustrating an example vehicle 100 that may implement the systems and techniques described herein. With reference to FIGS. 1A and 1B, a vehicle 100 may include a control unit 140 and a plurality of sensors 102-138, including satellite geopositioning system receivers (e.g., sensors) 108, occupancy sensors 112, 116, 118, 126, 128, tire pressure sensors 114, 120, cameras 122, 136, microphones 124, 134, impact sensors 130, radar 132, and LIDAR 138. The plurality of sensors 102-138, disposed in or on the vehicle, may be used for various purposes, such as autonomous and semi-autonomous navigation and control, crash avoidance, position determination, etc., as well to provide sensor data regarding objects and people in or on the vehicle 100. The sensors 102-138 may include one or more of a wide variety of sensors capable of detecting a variety of information useful for navigation and collision avoidance. Each of the sensors 102-138 may be in wired or wireless communication with a control unit 140, as well as with each other. In particular, the sensors may include one or more cameras 122, 136 or other optical sensors or photo optic sensors. The sensors may further include other types of object detection and ranging sensors, such as radar 132, LIDAR 138, IR sensors, and ultrasonic sensors. The sensors may further include tire pressure sensors 114, 120, humidity sensors, temperature sensors, satellite geopositioning sensors 108, accelerometers, vibration sensors, gyroscopes, gravimeters, impact sensors 130, force meters, stress meters, strain sensors, fluid sensors, chemical sensors, gas content analyzers, pH sensors, radiation sensors, Geiger counters, neutron detectors, biological material sensors, microphones 124, 134, occupancy sensors 112, 116, 118, 126, 128, proximity sensors, and other sensors.

The vehicle control unit 140 may be configured with processor-executable instructions to perform various embodiments using information received from various sensors, particularly the cameras 122, 136, radar 132, and LIDAR 138. In some embodiments, the control unit 140 may supplement the processing of camera images using distance and relative position information (e.g., relative bearing angle) that may be obtained from radar 132 and/or LIDAR 138 sensors. The control unit 140 may further be configured to control steering, breaking and speed of the vehicle 100 when operating in an autonomous or semi-autonomous mode using information regarding other vehicles determined using various embodiments.

Figure 1C:
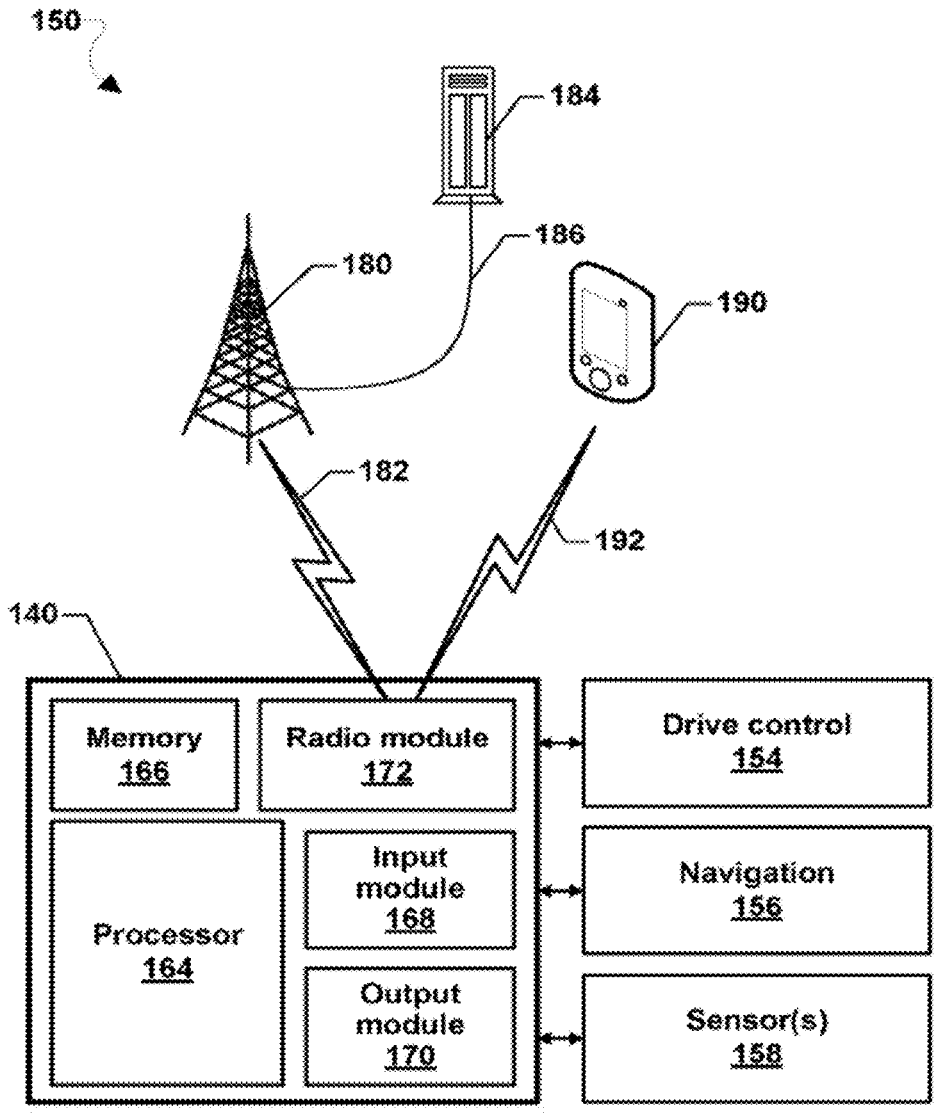
FIG. 1C is a block diagram illustrating components of a vehicle suitable for implementing various techniques described herein, in accordance with aspects of the present disclosure.

FIG. 1C is a component block diagram illustrating a system 150 of components and support systems suitable for implementing various embodiments. With reference to FIGS. 1A, 1B, and 1C, a vehicle 100 may include a control unit 140, which may include various circuits and devices used to control the operation of the vehicle 100. In the example illustrated in FIG. 1C, the control unit 140 includes a processor 164, memory 166, an input module 168, an output module 170 and a radio module 172. The control unit 140 may be coupled to and configured to control drive control components 154, navigation components 156, and one or more sensors 158 of the vehicle 100.

The control unit 140 may include a processor 164 that may be configured with processor-executable instructions to control maneuvering, navigation, and/or other operations of the vehicle 100, including operations of various embodiments. The processor 164 may be coupled to the memory 166. The control unit 140 may include the input module 168, the output module 170, and the radio module 172.

The radio module 172 may be configured for wireless communication. The radio module 172 may exchange signals 182 (e.g., command signals for controlling maneuvering, signals from navigation facilities, etc.) with a network node 180, and may provide the signals 182 to the processor 164 and/or the navigation components 156. In some embodiments, the radio module 172 may enable the vehicle 100 to communicate with a wireless communication device 190 through a wireless communication link 92. The wireless communication link 92 may be a bidirectional or unidirectional communication link and may use one or more communication protocols.

The input module 168 may receive sensor data from one or more vehicle sensors 158 as well as electronic signals from other components, including the drive control components 154 and the navigation components 156. The output module 170 may be used to communicate with or activate various components of the vehicle 100, including the drive control components 154, the navigation components 156, and the sensor(s) 158.

The control unit 140 may be coupled to the drive control components 154 to control physical elements of the vehicle 100 related to maneuvering and navigation of the vehicle, such as the engine, motors, throttles, steering elements, other control elements, braking or deceleration elements, and the like. The drive control components 154 may also include components that control other devices of the vehicle, including environmental controls (e.g., air conditioning and heating), external and/or interior lighting, interior and/or exterior informational displays (which may include a display screen or other devices to display information), safety devices (e.g., haptic devices, audible alarms, etc.), and other similar devices.

The control unit 140 may be coupled to the navigation components 156 and may receive data from the navigation components 156. The control unit 140 may be configured to use such data to determine the present position and orientation of the vehicle 100, as well as an appropriate course toward a destination. In various embodiments, the navigation components 156 may include or be coupled to a global navigation satellite system (GNSS) receiver system (e.g., one or more Global Positioning System (GPS) receivers) enabling the vehicle 100 to determine its current position using GNSS signals. Alternatively, or in addition, the navigation components 156 may include radio navigation receivers for receiving navigation beacons or other signals from radio nodes, such as Wi-Fi access points, cellular network sites, radio station, remote computing devices, other vehicles, etc. Through control of the drive control components 154, the processor 164 may control the vehicle 100 to navigate and maneuver. The processor 164 and/or the navigation components 156 may be configured to communicate with a server 184 on a network 186 (e.g., the Internet) using wireless signals 182 exchanged over a cellular data network via network node 180 to receive commands to control maneuvering, receive data useful in navigation, provide real-time position reports, and assess other data.

The control unit 140 may be coupled to one or more sensors 158. The sensor(s) 158 may include the sensors 102-138 as described, and may the configured to provide a variety of data to the processor 164.

While the control unit 140 is described as including separate components, in some embodiments some or all of the components (e.g., the processor 164, the memory 166, the input module 168, the output module 170, and the radio module 172) may be integrated in a single device or module, such as a system-on-chip (SOC) processing device. Such an SOC processing device may be configured for use in vehicles and be configured, such as with processor-executable instructions executing in the processor 164, to perform operations of various embodiments when installed into a vehicle.

Figure 1D:
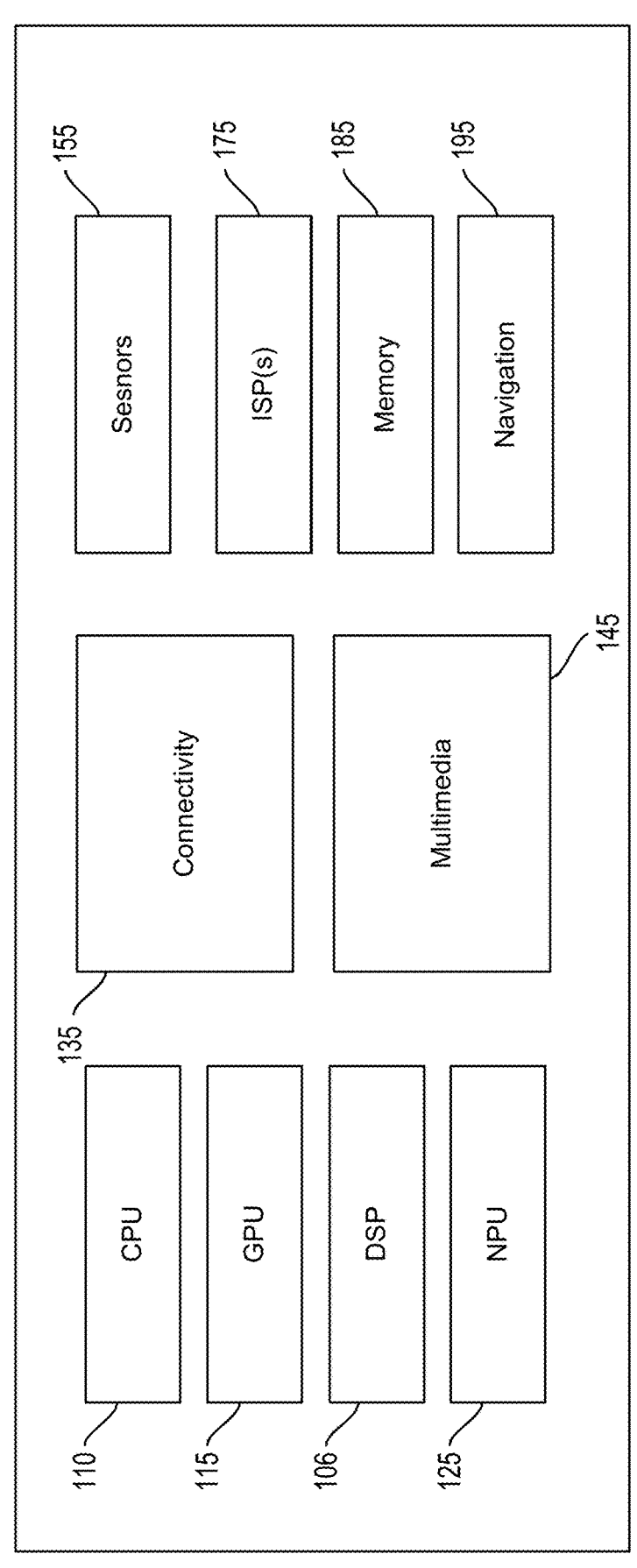
FIG. 1D illustrates an example implementation of a system-on-a-chip (SOC), in accordance with some examples.

FIG. 1D illustrates an example implementation of a system-on-a-chip (SOC) 105, which may include a central processing unit (CPU) 110 or a multi-core CPU, configured to perform one or more of the functions described herein. In some cases, the SOC 105 may be based on an ARM instruction set. In some cases, CPU 110 may be similar to processor 164. Parameters or variables (e.g., neural signals and synaptic weights), system parameters associated with a computational device (e.g., neural network with weights), delays, frequency bin information, task information, among other information may be stored in a memory block associated with a neural processing unit (NPU) 125, in a memory block associated with a CPU 110, in a memory block associated with a graphics processing unit (GPU) 115, in a memory block associated with a digital signal processor (DSP) 106, in a memory block 185, and/or may be distributed across multiple blocks. Instructions executed at the CPU 110 may be loaded from a program memory associated with the CPU 110 or may be loaded from a memory block 185.

The SOC 105 may also include additional processing blocks tailored to specific functions, such as a GPU 115, a DSP 106, a connectivity block 135, which may include fifth generation (5G) connectivity, fourth generation long term evolution (4G LTE) connectivity, Wi-Fi connectivity, USB connectivity, Bluetooth connectivity, and the like, and a multimedia processor 145 that may, for example, detect and recognize gestures. In one implementation, the NPU is implemented in the CPU 110, DSP 106, and/or GPU 115. The SOC 105 may also include a sensor processor 155, image signal processors (ISPs) 175, and/or navigation module 195, which may include a global positioning system. In some cases, the navigation module 195 may be similar to navigation components 156 and sensor processor 155 may accept input from, for example, one or more sensors 158. In some cases, the connectivity block 135 may be similar to the radio module 172.

Figure 2A:
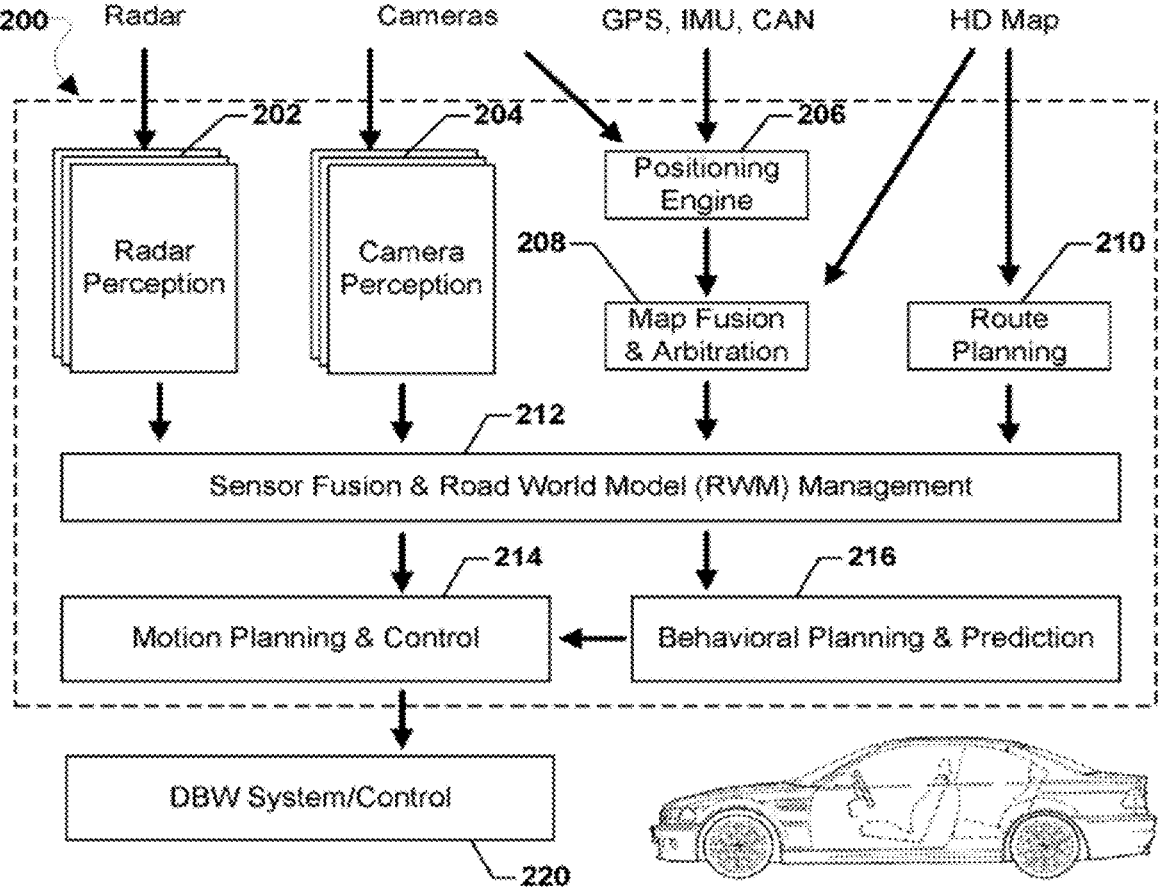
FIG. 2A is a component block diagram illustrating components of an example vehicle management system, in accordance with aspects of the present disclosure.

FIG. 2A illustrates an example of vehicle applications, subsystems, computational elements, or units within a vehicle management system 200, which may be utilized within a vehicle, such as vehicle 100 of FIG. 1A. With reference to FIGS. 1A-2A, in some embodiments, the various vehicle applications, computational elements, or units within vehicle management system 200 may be implemented within a system of interconnected computing devices (i.e., subsystems), that communicate data and commands to each other. In other embodiments, the vehicle management system 200 may be implemented as a plurality of vehicle applications executing within a single computing device, such as separate threads, processes, algorithms or computational elements. However, the use of the term vehicle applications in describing various embodiments are not intended to imply or require that the corresponding functionality is implemented within a single autonomous (or semi-autonomous) vehicle management system computing device, although that is a potential implementation embodiment. Rather the use of the term vehicle applications is intended to encompass subsystems with independent processors, computational elements (e.g., threads, algorithms, subroutines, etc.) running in one or more computing devices, and combinations of subsystems and computational elements.

In various embodiments, the vehicle applications executing in a vehicle management system 200 may include (but is not limited to) a radar perception vehicle application 202, a camera perception vehicle application 204, a positioning engine vehicle application 206, a map fusion and arbitration vehicle application 208, a route vehicle planning application 210, sensor fusion and road world model (RWM) management vehicle application 212, motion planning and control vehicle application 214, and behavioral planning and prediction vehicle application 216. The vehicle applications 202-216 are merely examples of some vehicle applications in one example configuration of the vehicle management system 200. In other configurations consistent with various embodiments, other vehicle applications may be included, such as additional vehicle applications for other perception sensors (e.g., LIDAR perception layer, etc.), additional vehicle applications for planning and/or control, additional vehicle applications for modeling, etc., and/or certain of the vehicle applications 202-216 may be excluded from the vehicle management system 200. Each of the vehicle applications 202-216 may exchange data, computational results and commands.

The vehicle management system 200 may receive and process data from sensors (e.g., radar, LIDAR, cameras, inertial measurement units (IMU) etc.), navigation systems (e.g., GPS receivers, IMUs, etc.), vehicle networks (e.g., Controller Area Network (CAN) bus), and databases in memory (e.g., digital map data). The vehicle management system 200 may output vehicle control commands or signals to the drive by wire (DBW) system/control unit 220, which is a system, subsystem or computing device that interfaces directly with vehicle steering, throttle and brake controls. The configuration of the vehicle management system 200 and DBW system/control unit 220 illustrated in FIG. 2A is merely an example configuration and other configurations of a vehicle management system and other vehicle components may be used in the various embodiments. As an example, the configuration of the vehicle management system 200 and DBW system/control unit 220 illustrated in FIG. 2A may be used in a vehicle configured for autonomous or semi-autonomous operation while a different configuration may be used in a non-autonomous vehicle.

The radar perception vehicle application 202 may receive data from one or more detection and ranging sensors, such as radar (e.g., 132) and/or LIDAR (e.g., 138), and process the data to recognize and determine locations of other vehicles and objects within a vicinity of the vehicle 100. The radar perception vehicle application 202 may include use of neural network processing and artificial intelligence methods to recognize objects and vehicles, and pass such information on to the sensor fusion and RWM management vehicle application 212.

The camera perception vehicle application 204 may receive data from one or more cameras, such as cameras (e.g., 122, 136), and process the data to recognize and determine locations of other vehicles and objects within a vicinity of the vehicle 100. The camera perception vehicle application 204 may include use of neural network processing and artificial intelligence methods to recognize objects and vehicles, and pass such information on to the sensor fusion and RWM management vehicle application 212.

The positioning engine vehicle application 206 may receive data from various sensors and process the data to determine a position of the vehicle 100. The various sensors may include, but is not limited to, GPS sensor, an IMU, and/or other sensors connected via a CAN bus. The positioning engine vehicle application 206 may also utilize inputs from one or more cameras, such as cameras (e.g., 122, 136) and/or any other available sensor, such as radars, LIDARs, etc.

The map fusion and arbitration vehicle application 208 may access data within a high-definition (HD) map database and receive output received from the positioning engine vehicle application 206 and process the data to further determine the position of the vehicle 100 within the map, such as location within a lane of traffic, position within a street map, etc. The HD map database may be stored in a memory (e.g., memory 166). For example, the map fusion and arbitration vehicle application 208 may convert latitude and longitude information from GPS into locations within a surface map of roads contained in the HD map database. GPS position fixes include errors, so the map fusion and arbitration vehicle application 208 may function to determine a best guess location of the vehicle 100 within a roadway based upon an arbitration between the GPS coordinates and the HD map data. For example, while GPS coordinates may place the vehicle 100 near the middle of a two-lane road in the HD map, the map fusion and arbitration vehicle application 208 may determine from the direction of travel that the vehicle 100 is most likely aligned with the travel lane consistent with the direction of travel. The map fusion and arbitration vehicle application 208 may pass map-based location information to the sensor fusion and RWM management vehicle application 212.

The route planning vehicle application 210 may utilize the HD map, as well as inputs from an operator or dispatcher to plan a route to be followed by the vehicle 100 to a particular destination. The route planning vehicle application 210 may pass map-based location information to the sensor fusion and RWM management vehicle application 212. However, the use of a prior map by other vehicle applications, such as the sensor fusion and RWM management vehicle application 212, etc., is not required. For example, other stacks may operate and/or control the vehicle based on perceptual data alone without a provided map, constructing lanes, boundaries, and the notion of a local map as perceptual data is received.

The sensor fusion and RWM management vehicle application 212 may receive data and outputs produced by one or more of the radar perception vehicle application 202, camera perception vehicle application 204, map fusion and arbitration vehicle application 208, and route planning vehicle application 210, and use some or all of such inputs to estimate or refine the location and state of the vehicle 100 in relation to the road, other vehicles on the road, and other objects within a vicinity of the vehicle 100. For example, the sensor fusion and RWM management vehicle application 212 may combine imagery data from the camera perception vehicle application 204 with arbitrated map location information from the map fusion and arbitration vehicle application 208 to refine the determined position of the vehicle within a lane of traffic. As another example, the sensor fusion and RWM management vehicle application 212 may combine object recognition and imagery data from the camera perception vehicle application 204 with object detection and ranging data from the radar perception vehicle application 202 to determine and refine the relative position of other vehicles and objects in the vicinity of the vehicle. As another example, the sensor fusion and RWM management vehicle application 212 may receive information from vehicle-to-vehicle (V2V) communications (such as via the CAN bus) regarding other vehicle positions and directions of travel and combine that information with information from the radar perception vehicle application 202 and the camera perception vehicle application 204 to refine the locations and motions of other vehicles. The sensor fusion and RWM management vehicle application 212 may output refined location and state information of the vehicle 100, as well as refined location and state information of other vehicles and objects in the vicinity of the vehicle, to the motion planning and control vehicle application 214 and/or the behavior planning and prediction vehicle application 216.

As a further example, the sensor fusion and RWM management vehicle application 212 may use dynamic traffic control instructions directing the vehicle 100 to change speed, lane, direction of travel, or other navigational element(s), and combine that information with other received information to determine refined location and state information. The sensor fusion and RWM management vehicle application 212 may output the refined location and state information of the vehicle 100, as well as refined location and state information of other vehicles and objects in the vicinity of the vehicle 100, to the motion planning and control vehicle application 214, the behavior planning and prediction vehicle application 216 and/or devices remote from the vehicle 100, such as a data server, other vehicles, etc., via wireless communications, such as through C-V2X connections, other wireless connections, etc.

As a still further example, the sensor fusion and RWM management vehicle application 212 may monitor perception data from various sensors, such as perception data from a radar perception vehicle application 202, camera perception vehicle application 204, other perception vehicle application, etc., and/or data from one or more sensors themselves to analyze conditions in the vehicle sensor data. The sensor fusion and RWM management vehicle application 212 may be configured to detect conditions in the sensor data, such as sensor measurements being at, above, or below a threshold, certain types of sensor measurements occurring, etc., and may output the sensor data as part of the refined location and state information of the vehicle 100 provided to the behavior planning and prediction vehicle application 216 and/or devices remote from the vehicle 100, such as a data server, other vehicles, etc., via wireless communications, such as through C-V2X connections, other wireless connections, etc.

The refined location and state information may include vehicle descriptors associated with the vehicle 100 and the vehicle owner and/or operator, such as: vehicle specifications (e.g., size, weight, color, on board sensor types, etc.); vehicle position, speed, acceleration, direction of travel, attitude, orientation, destination, fuel/power level(s), and other state information; vehicle emergency status (e.g., is the vehicle an emergency vehicle or private individual in an emergency); vehicle restrictions (e.g., heavy/wide load, turning restrictions, high occupancy vehicle (HOV) authorization, etc.); capabilities (e.g., all-wheel drive, four-wheel drive, snow tires, chains, connection types supported, on board sensor operating statuses, on board sensor resolution levels, etc.) of the vehicle; equipment problems (e.g., low tire pressure, weak breaks, sensor outages, etc.); owner/operator travel preferences (e.g., preferred lane, roads, routes, and/or destinations, preference to avoid tolls or highways, preference for the fastest route, etc.); permissions to provide sensor data to a data agency server (e.g., 184); and/or owner/operator identification information.

The behavioral planning and prediction vehicle application 216 of the autonomous vehicle system 200 may use the refined location and state information of the vehicle 100 and location and state information of other vehicles and objects output from the sensor fusion and RWM management vehicle application 212 to predict future behaviors of other vehicles and/or objects. For example, the behavioral planning and prediction vehicle application 216 may use such information to predict future relative positions of other vehicles in the vicinity of the vehicle based on own vehicle position and velocity and other vehicle positions and velocity. Such predictions may take into account information from the HD map and route planning to anticipate changes in relative vehicle positions as host and other vehicles follow the roadway. The behavioral planning and prediction vehicle application 216 may output other vehicle and object behavior and location predictions to the motion planning and control vehicle application 214.

Additionally, the behavior planning and prediction vehicle application 216 may use object behavior in combination with location predictions to plan and generate control signals for controlling the motion of the vehicle 100. For example, based on route planning information, refined location in the roadway information, and relative locations and motions of other vehicles, the behavior planning and prediction vehicle application 216 may determine that the vehicle 100 needs to change lanes and accelerate, such as to maintain or achieve minimum spacing from other vehicles, and/or prepare for a turn or exit. As a result, the behavior planning and prediction vehicle application 216 may calculate or otherwise determine a steering angle for the wheels and a change to the throttle setting to be commanded to the motion planning and control vehicle application 214 and DBW system/control unit 220 along with such various parameters necessary to effectuate such a lane change and acceleration. One such parameter may be a computed steering wheel command angle.

The motion planning and control vehicle application 214 may receive data and information outputs from the sensor fusion and RWM management vehicle application 212 and other vehicle and object behavior as well as location predictions from the behavior planning and prediction vehicle application 216, and use this information to plan and generate control signals for controlling the motion of the vehicle 100 and to verify that such control signals meet safety requirements for the vehicle 100. For example, based on route planning information, refined location in the roadway information, and relative locations and motions of other vehicles, the motion planning and control vehicle application 214 may verify and pass various control commands or instructions to the DBW system/control unit 220.

The DBW system/control unit 220 may receive the commands or instructions from the motion planning and control vehicle application 214 and translate such information into mechanical control signals for controlling wheel angle, brake and throttle of the vehicle 100. For example, DBW system/control unit 220 may respond to the computed steering wheel command angle by sending corresponding control signals to the steering wheel controller.

In various embodiments, the vehicle management system 200 may include functionality that performs safety checks or oversight of various commands, planning or other decisions of various vehicle applications that could impact vehicle and occupant safety. Such safety check or oversight functionality may be implemented within a dedicated vehicle application or distributed among various vehicle applications and included as part of the functionality. In some embodiments, a variety of safety parameters may be stored in memory and the safety checks or oversight functionality may compare a determined value (e.g., relative spacing to a nearby vehicle, distance from the roadway centerline, etc.) to corresponding safety parameter(s), and issue a warning or command if the safety parameter is or will be violated. For example, a safety or oversight function in the behavior planning and prediction vehicle application 216 (or in a separate vehicle application) may determine the current or future separate distance between another vehicle (as refined by the sensor fusion and RWM management vehicle application 212) and the vehicle 100 (e.g., based on the world model refined by the sensor fusion and RWM management vehicle application 212), compare that separation distance to a safe separation distance parameter stored in memory, and issue instructions to the motion planning and control vehicle application 214 to speed up, slow down or turn if the current or predicted separation distance violates the safe separation distance parameter. As another example, safety or oversight functionality in the motion planning and control vehicle application 214 (or a separate vehicle application) may compare a determined or commanded steering wheel command angle to a safe wheel angle limit or parameter, and issue an override command and/or alarm in response to the commanded angle exceeding the safe wheel angle limit.

Some safety parameters stored in memory may be static (i.e., unchanging over time), such as maximum vehicle speed. Other safety parameters stored in memory may be dynamic in that the parameters are determined or updated continuously or periodically based on vehicle state information and/or environmental conditions. Non-limiting examples of safety parameters include maximum safe speed, maximum brake pressure, maximum acceleration, and the safe wheel angle limit, all of which may be a function of roadway and weather conditions.

Figure 2B:
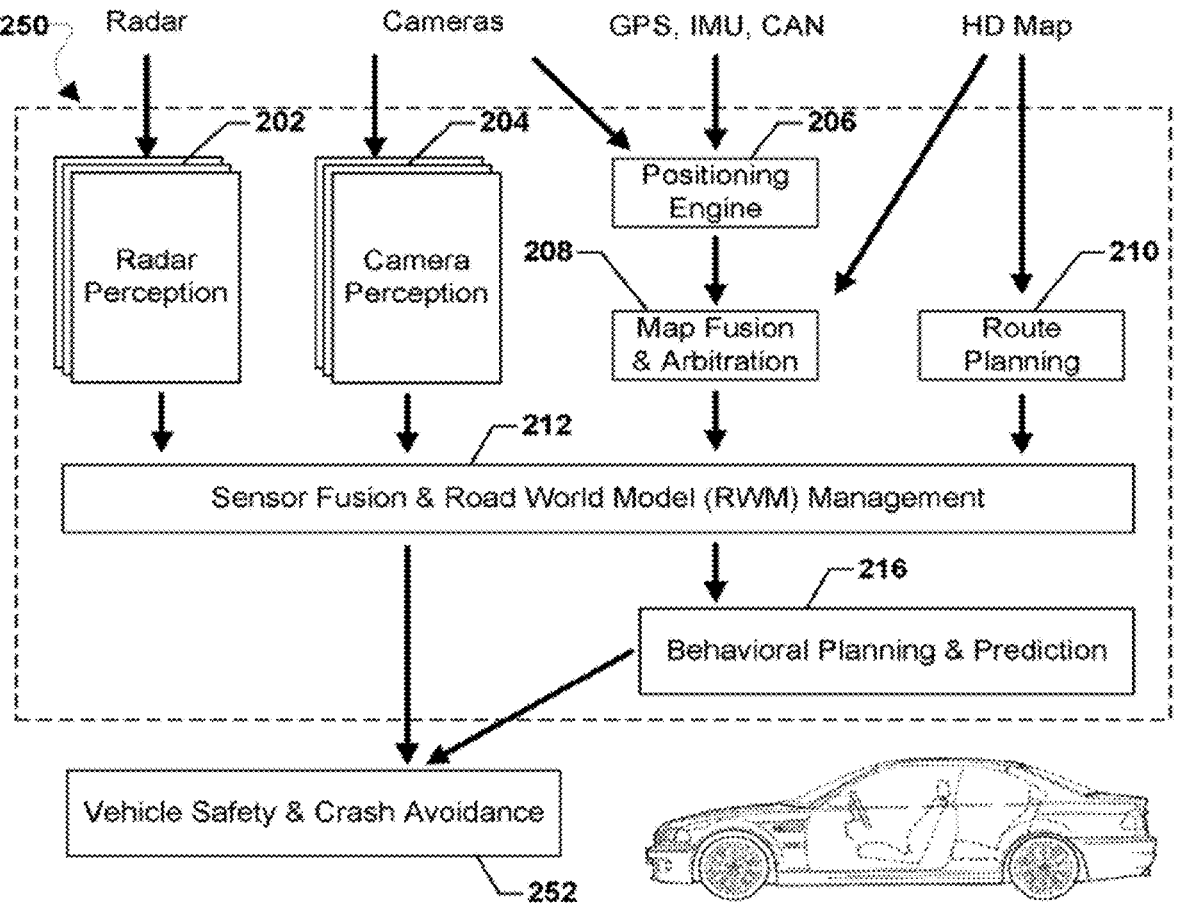
FIG. 2B is a component block diagram illustrating components of another example vehicle management system, in accordance with aspects of the present disclosure.

FIG. 2B illustrates an example of vehicle applications, subsystems, computational elements, or units within a vehicle management system 250, which may be utilized within a vehicle 100. With reference to FIGS. 1A-2B, in some embodiments, the vehicle applications 202, 204, 206, 208, 210, 212, and 216 of the vehicle management system 200 may be similar to those described with reference to FIG. 2A and the vehicle management system 250 may operate similar to the vehicle management system 200, except that the vehicle management system 250 may pass various data or instructions to a vehicle safety and crash avoidance system 252 rather than the DBW system/control unit 220. For example, the configuration of the vehicle management system 250 and the vehicle safety and crash avoidance system 252 illustrated in FIG. 2B may be used in a non-autonomous vehicle.

In various embodiments, the behavioral planning and prediction vehicle application 216 and/or sensor fusion and RWM management vehicle application 212 may output data to the vehicle safety and crash avoidance system 252. For example, the sensor fusion and RWM management vehicle application 212 may output sensor data as part of refined location and state information of the vehicle 100 provided to the vehicle safety and crash avoidance system 252. The vehicle safety and crash avoidance system 252 may use the refined location and state information of the vehicle 100 to make safety determinations relative to the vehicle 100 and/or occupants of the vehicle 100. As another example, the behavioral planning and prediction vehicle application 216 may output behavior models and/or predictions related to the motion of other vehicles to the vehicle safety and crash avoidance system 252. The vehicle safety and crash avoidance system 252 may use the behavior models and/or predictions related to the motion of other vehicles to make safety determinations relative to the vehicle 100 and/or occupants of the vehicle 100.

In various embodiments, the vehicle safety and crash avoidance system 252 may include functionality that performs safety checks or oversight of various commands, planning, or other decisions of various vehicle applications, as well as human driver actions, that could impact vehicle and occupant safety. In some embodiments, a variety of safety parameters may be stored in memory and the vehicle safety and crash avoidance system 252 may compare a determined value (e.g., relative spacing to a nearby vehicle, distance from the roadway centerline, etc.) to corresponding safety parameter(s), and issue a warning or command if the safety parameter is or will be violated. For example, a vehicle safety and crash avoidance system 252 may determine the current or future separate distance between another vehicle (as refined by the sensor fusion and RWM management vehicle application 212) and the vehicle (e.g., based on the world model refined by the sensor fusion and RWM management vehicle application 212), compare that separation distance to a safe separation distance parameter stored in memory, and issue instructions to a driver to speed up, slow down or turn if the current or predicted separation distance violates the safe separation distance parameter. As another example, a vehicle safety and crash 252 may compare a human driver's change in steering wheel angle to a safe wheel angle limit or parameter, and issue an override command and/or alarm in response to the steering wheel angle exceeding the safe wheel angle limit.

As indicated above, different modes of data received from different sensors may be fused into a single data modality which can provide more information about the environment than would be available from a single type of sensor. In some cases, one or more machine learning techniques may be used as a part of sensor fusion.

A neural network is an example of a machine learning system, and a neural network can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input. The connections between layers of a neural network may be fully connected or locally connected. Various examples of neural network architectures are described below with respect to FIG. 3A-FIG. 4.

Some sensor fusion systems utilize neural networks or other machine learning systems to fuse disparate modalities of data, such as image data, radar data, and LIDAR data. Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 3A:
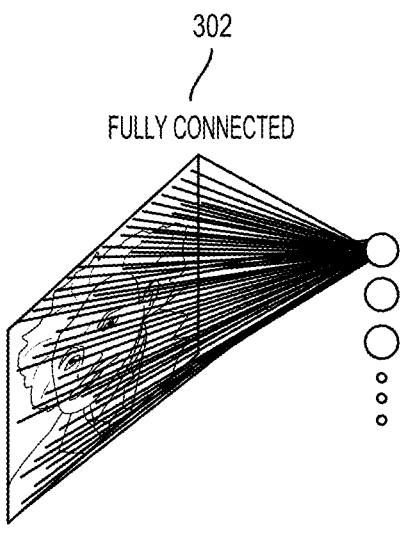
FIG. 3A-FIG. 4 are diagrams illustrating examples of neural networks, in accordance with aspects of the present disclosure.
Figure 3B:
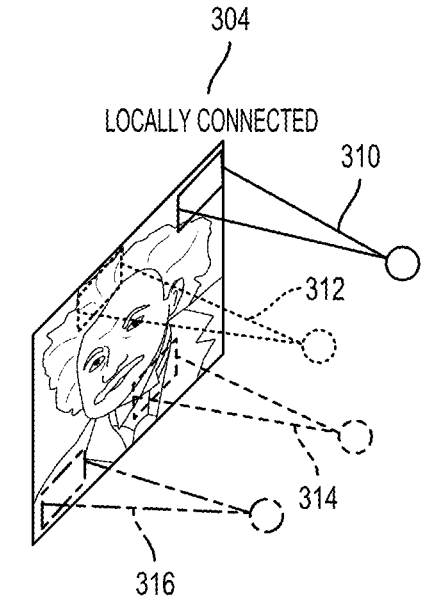

The connections between layers of a neural network may be fully connected or locally connected. FIG. 3A illustrates an example of a fully connected neural network 302. In a fully connected neural network 302, a neuron in a first layer may communicate its output to every neuron in a second layer, so that each neuron in the second layer will receive input from every neuron in the first layer. FIG. 3B illustrates an example of a locally connected neural network 304. In a locally connected neural network 304, a neuron in a first layer may be connected to a limited number of neurons in the second layer. More generally, a locally connected layer of the locally connected neural network 304 may be configured so that each neuron in a layer will have the same or a similar connectivity pattern, but with connections strengths that may have different values (e.g., 310, 312, 314, and 316). The locally connected connectivity pattern may give rise to spatially distinct receptive fields in a higher layer, because the higher layer neurons in a given region may receive inputs that are tuned through training to the properties of a restricted portion of the total input to the network.

Figure 3C:
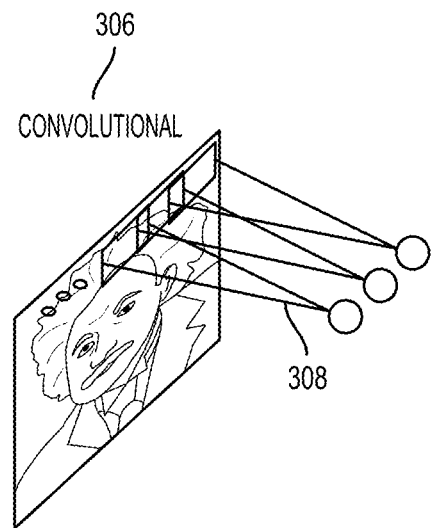

One example of a locally connected neural network is a convolutional neural network. FIG. 3C illustrates an example of a convolutional neural network 306. The convolutional neural network 306 may be configured such that the connection strengths associated with the inputs for each neuron in the second layer are shared (e.g., 308). Convolutional neural networks may be well suited to problems in which the spatial location of inputs is meaningful. Convolutional neural network 306 may be used to perform one or more aspects of video compression and/or decompression, according to aspects of the present disclosure.

Figure 3D:
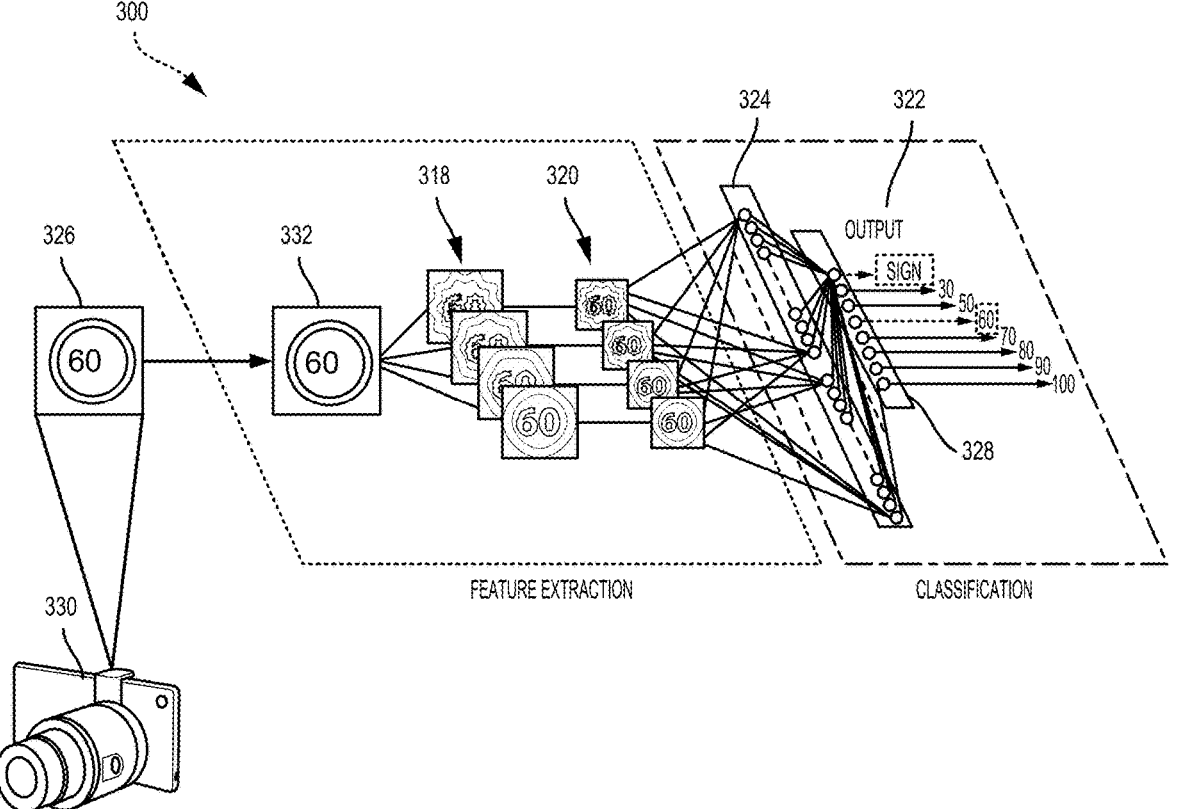

One type of convolutional neural network is a deep convolutional network (DCN). FIG. 3D illustrates a detailed example of a DCN 300 designed to recognize visual features from an image 326 input from an image capturing device 330, such as a car-mounted camera. The DCN 300 of the current example may be trained to identify traffic signs and a number provided on the traffic sign. Of course, the DCN 300 may be trained for other tasks, such as identifying lane markings or identifying traffic lights.

The DCN 300 may be trained with supervised learning. During training, the DCN 300 may be presented with an image, such as the image 326 of a speed limit sign, and a forward pass may then be computed to produce an output 322. The DCN 300 may include a feature extraction section and a classification section. Upon receiving the image 326, a convolutional layer 332 may apply convolutional kernels (not shown) to the image 326 to generate a first set of feature maps 318. As an example, the convolutional kernel for the convolutional layer 332 may be a 5×5 kernel that generates 28×28 feature maps. In the present example, because four different feature maps are generated in the first set of feature maps 318, four different convolutional kernels were applied to the image 326 at the convolutional layer 332. The convolutional kernels may also be referred to as filters or convolutional filters.

The first set of feature maps 318 may be subsampled by a max pooling layer (not shown) to generate a second set of feature maps 320. The max pooling layer reduces the size of the first set of feature maps 318. That is, a size of the second set of feature maps 320, such as 14×14, is less than the size of the first set of feature maps 318, such as 28×28. The reduced size provides similar information to a subsequent layer while reducing memory clonsumption. The second set of feature maps 320 may be further convolved via one or more subsequent convolutional layers (not shown) to generate one or more subsequent sets of feature maps (not shown).

In the example of FIG. 3D, the second set of feature maps 320 is convolved to generate a first feature vector 324. Furthermore, the first feature vector 324 is further convolved to generate a second feature vector 328. Each feature of the second feature vector 328 may include a number that corresponds to a possible feature of the image 326, such as "sign," "60," and "100." A softmax function (not shown) may convert the numbers in the second feature vector 328 to a probability. As such, an output 322 of the DCN 300 is a probability of the image 326 including one or more features.

In the present example, the probabilities in the output 322 for "sign" and "60" are higher than the probabilities of the others of the output 322, such as "30," "40," "50," "70," "80," "90," and "100". Before training, the output 322 produced by the DCN 300 is likely to be incorrect. Thus, an error may be calculated between the output 322 and a target output. The target output is the ground truth of the image 326 (e.g., "sign" and "60"). The weights of the DCN 300 may then be adjusted so the output 322 of the DCN 300 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 322 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., feature maps 320) receiving input from a range of neurons in the previous layer (e.g., feature maps 318) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction.

Figure 4:
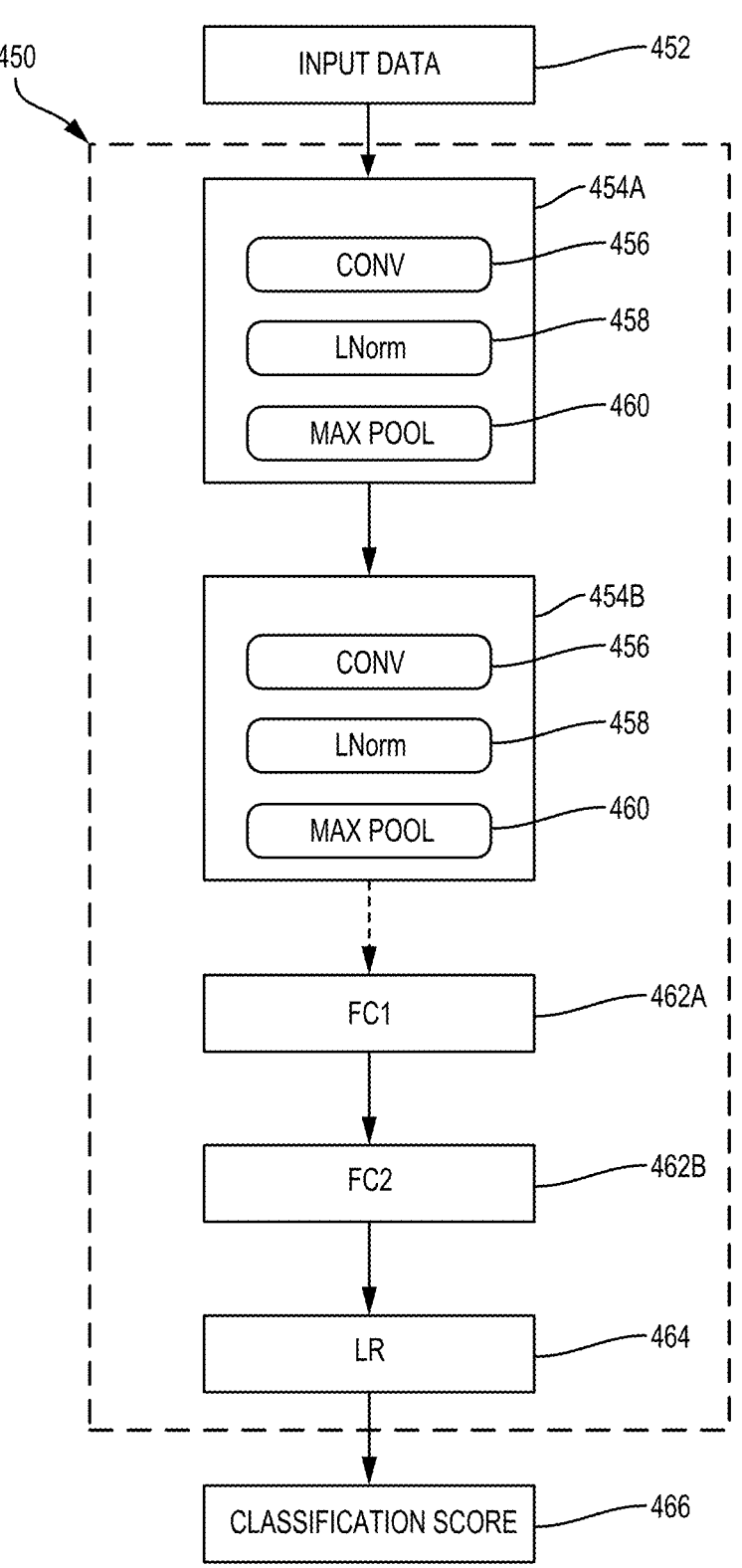

FIG. 4 is a block diagram illustrating an example of a deep convolutional network 450. The deep convolutional network 450 may include multiple different types of layers based on connectivity and weight sharing. As shown in FIG. 4, the deep convolutional network 450 includes the convolution blocks 454A, 454B. Each of the convolution blocks 454A, 454B may be configured with a convolution layer (CONV) 456, a normalization layer (LNorm) 458, and a max pooling layer (MAX POOL) 460.

The convolution layers 456 may include one or more convolutional filters, which may be applied to the input data 452 to generate a feature map. Although only two convolution blocks 454A, 454B are shown, the present disclosure is not so limiting, and instead, any number of convolution blocks (e.g., convolution blocks 454A, 454B) may be included in the deep convolutional network 450 according to design preference. The normalization layer 458 may normalize the output of the convolution filters. For example, the normalization layer 458 may provide whitening or lateral inhibition. The max pooling layer 460 may provide down sampling aggregation over space for local invariance and dimensionality reduction.

The parallel filter banks, for example, of a deep convolutional network may be loaded on a CPU 110 or GPU 115 of an SOC 105 to achieve high performance and low power consumption. In alternative embodiments, the parallel filter banks may be loaded on the DSP 106 or an ISP 175 of an SOC 105. In addition, the deep convolutional network 450 may access other processing blocks that may be present on the SOC 105, such as sensor processor 155 and navigation module 195, dedicated, respectively, to sensors and navigation.

The deep convolutional network 450 may also include one or more fully connected layers, such as layer 462A (labeled "FC1") and layer 462B (labeled "FC2"). The deep convolutional network 450 may further include a logistic regression (LR) layer 464. Between each layer 456, 458, 460, 462A, 462B, 464 of the deep convolutional network 450 are weights (not shown) that are to be updated. The output of each of the layers (e.g., 456, 458, 460, 462A, 462B, 464) may serve as an input of a succeeding one of the layers (e.g., 456, 458, 460, 462A, 462B, 464) in the deep convolutional network 450 to learn hierarchical feature representations from input data 452 (e.g., images, audio, video, sensor data and/or other input data) supplied at the first of the convolution blocks 454A. The output of the deep convolutional network 450 is a classification score 466 for the input data 452. The classification score 466 may be a set of probabilities, where each probability is the probability of the input data including a feature from a set of features.

Generally, estimating a height of a detect object is relatively easy as heights of objects above a ground plane rarely change and are relativity predicable for classes of objects. In some cases, heights for certain objects may even be defined by regulations. Heights for relatively flat objects or region, such as streets, lane markings, etc., on the ground plane can be easily estimated as zero. This relative predictability may be useful when combined with known camera properties for estimating object distance based, for example on how far from a bottom edge the object is located.

Figure 5:
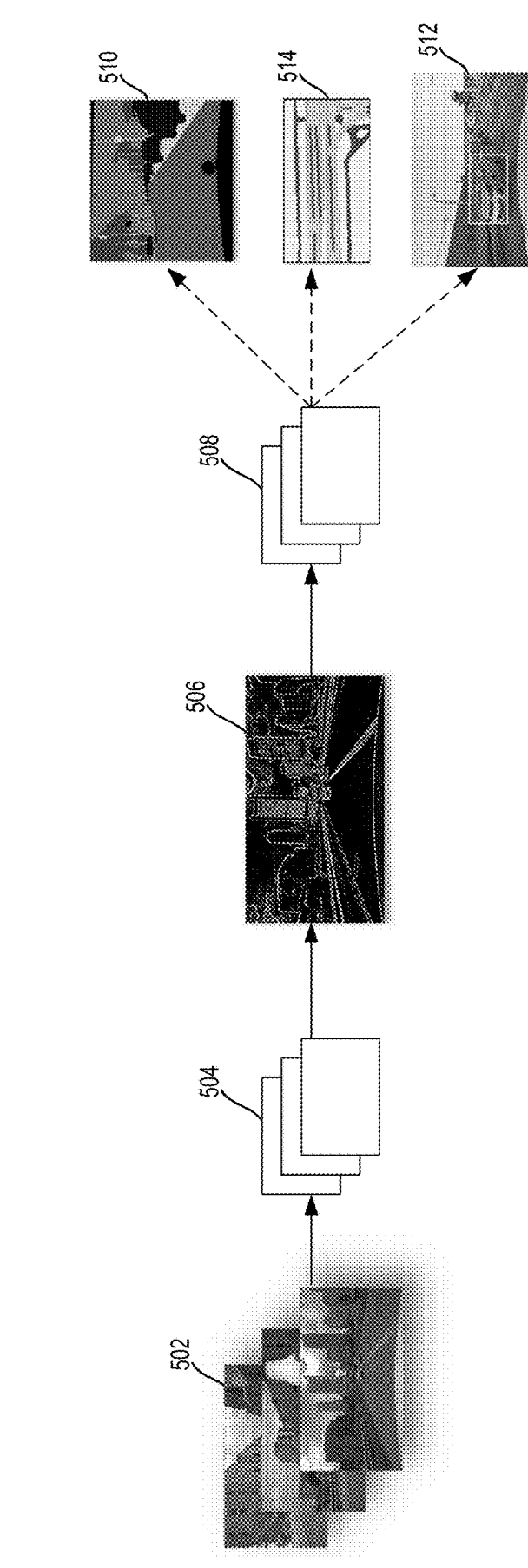
FIG. 5 is a diagram illustrating an example of a system for processing images for use by a device, in accordance with aspects of the present disclosure.

FIG. 5 illustrates a system 500 for processing images for use by a device (e.g., a vehicle or computing system of the vehicle, a mobile device, an extended reality (XR) device, etc.), in accordance with aspects of the present disclosure. As shown in FIG. 5, input camera data 502 (e.g., images captured by cameras such as cameras 122, 136) may be input to feature extractors 504. The feature extractors 504 may be used to identify certain features in the camera data. In some cases, the feature extractors 504 may be ML based. For example, the feature extractors may be implemented as one or more neural networks (NN), convolutional network, or deep convolutional network, such as shown in FIG. 4. As an example, the feature extractors 504 may include one or more layers or transformer blocks which may include feature maps for recognizing certain features. The feature extractors 504 may output the identified features as intermediate camera features 506. Of note, while shown as a line drawing, the intermediate camera features 506 may be output as a set of feature vectors.

In some cases, one or more transformation operations 508 may be performed on the intermediate camera features 506. For example, the one or more transformation operations 508 may perform segmentation 510 based on the intermediate camera features 506, perform object detection 512 based on the intermediate camera features 506, or perform a perspective transformation 514 to convert the intermediate camera features 506 from, for example, a frontal view of an environment from a vehicle, to BEV projected camera features, as if features were generated based on a camera positioned above the vehicle. It should be understood that the listed transformations are not intended to be limiting and many other transformation operations may be performed. In some cases, the one or more transformation operations 508 may be ML based. For example, each of the one or more transformation operations 508 may be implemented as one or more neural networks (NN), convolutional network, or deep convolutional network, such as shown in FIG. 4.

In some cases, sensor data from multiple sensors, such as camera, radar, and LIDAR sensors, may be fused to generate a semantically segmented BEV. In some examples, this sensor fusion may be performed based on the intermediate camera features 506. Information from three dimensions (3D) can be useful for generating the segmented BEV, as information about how far an object is (e.g., depth information) can be useful for separating objects from the background. However, sensors to directly obtain depth information, such as radar and lidar sensors, can be expensive and can substantially increase costs of the vehicle. Additionally, sensors to directly obtain depth information may draw substantial amounts of power and techniques that can allow use of such sensors to be reduced may help reduce power consumption of vehicles. Techniques to derive depth information using a single camera, providing two dimensional (2D) images, may be useful to help reduce costs, for example, by reducing or eliminating reliance on sensors which can directly obtain depth information.

Generally, it can be easier to estimate a height of an object than to estimate the distance of the object from a viewpoint. For example, for ground-based vehicles that do not need to consider flying objects, a height of an object over a ground plane is image position invariant and scale variant. That is, the height of an object does not change relative to the ground plane no matter where in the image the object is, but the size of the object-ground plane relationship does change where the object is further away from the viewpoint. Thus, a roof of a car is approximately 1.8 meters above the ground, and this is independent of where in the image the roof of the car is located. These properties may be exploited to provide accurate pseudo depth information from captured 2D images, such as those produced by a monocular camera. As an example, some ML models, such as certain types of neural networks, may be more able to reliably handle scale variance (e.g., using stride/pooling) as compared to position invariance for generating predictions.

To allow a ML model to predict distances for features based on height, geometrical distance information may be passed into the ML model, for example, during a training process. This geometrical distance information may be based on geometric properties of images produced by cameras of the vehicle. The geometric properties of the images can be influenced by camera properties, such as the position of the camera on the vehicle, focal length of the camera and lens, distortion from the camera and lens, etc., and the geometrical distance information may be provided based on known camera properties. For example, geometrical distance information may be passed into a ML model using distance map images and these distance map images may be generated based on known geometric properties of the images produced by cameras of the vehicle.

In some cases, additional geometrical distance information may be provided based on predicated variations of the camera properties. For example, a height of the camera may vary due to vehicle suspension movement and during inference, multiple sets of distance map images may be provided based on possible movement of the camera as input to the ML model. In some cases, these multiple sets of distance map images may also be provided along with height information from the vehicle suspension as input to the ML model to help compensate for the movement. In some cases, a camera calibration matrix can include camera properties for a range of cameras, mounting locations, and camera movement to help compensate for different installation locations in different vehicles, different vehicle pitch angles, etc.

FIG. 6 illustrates a set of distance map images 600 based on known camera properties, in accordance with aspects of the present disclosure. FIG. 6 shows four distance map images 600 for objects that are at four different heights above the ground. A first distance map 602 illustrates distances for objects detected in the images which are at a ground level (e.g., on a ground plane), such as a street, lane markings, curbs, grass, etc. A second distance map 604 illustrates distances for objects which are, in this example, half a meter above the ground, such as head lights, wheels, barriers, etc. A third distance map 606 illustrates distances for objects which are about a meter above the ground, such as windshields, shrubs, etc. A fourth distance map 608 illustrates distances for objects which are about two meters above the ground, such signs, trucks, etc. Of note, while shown as two-dimensional representations in this example, in some cases, the distance map images may be one-dimensional representations (e.g., an array of values) indicating distances with respect to a height dimension.

In some cases, each distance map indicates how far an object of a corresponding height from the ground is from the camera based on a relative height of the object in the image (e.g., how far from the bottom or top of the image). As an example of how the distance maps may be applied, if an image includes a detected object 610 that is at a ground level, such as a manhole cover, that is approximately one third of a way from the bottom of the image, as shown superimposed on the first distance map 602, it can be determined that the object is, in this example, 10 meters away from the camera. Objects located further from the bottom of the image may be determined to be further from the camera. While four distance map images 600 are illustrated in FIG. 4, it should be understood that many more distance map images may be used and that these distance map images may be based on known (and/or predicted) camera properties.

Figure 7:
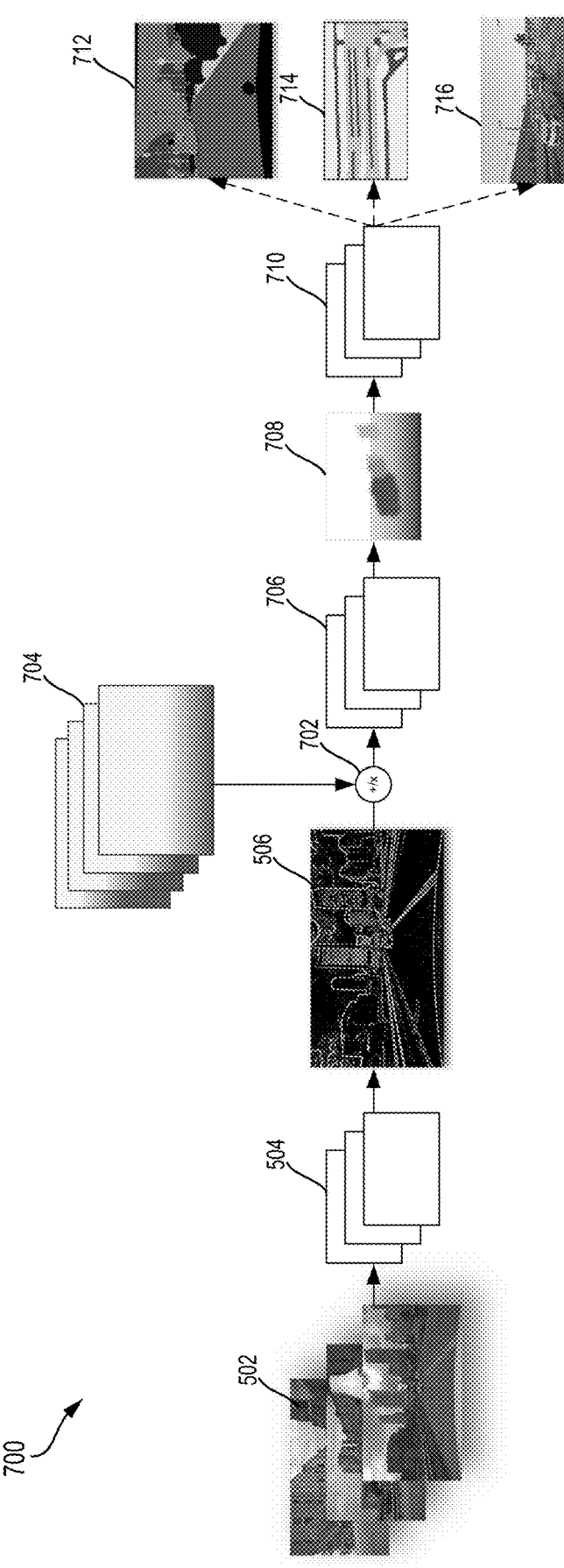
FIG. 7 is a diagram illustrating an example of a system for predicting distances of detected objects, in accordance with aspects of the present disclosure.

FIG. 7 illustrates a system 700 for predicting distances of detected objects, in accordance with aspects of the present disclosure. In some cases, system 700 is similar to system 500. As shown in FIG. 7, received camera data 502 (e.g., images captured by cameras such as cameras 122, 136) may be input to feature extractors 504 which may be used to identify certain features in the camera data. These feature extractors 504 may be ML based and may include feature maps for recognizing certain features. The feature extractors 504 may output the identified features as intermediate camera features 506. In some cases, the feature extractors 504 may have been trained on relative heights of identified features. For example, the feature extractors 504 may recognize that certain features may represent an object such as a windshield or wheel and that combinations of these features form another object, such as a car. Similarly, the feature extractors 504 may have been trained that a wheel may commonly be centered about 0.25 meters above ground level or that a windshield base is often about 1.1 meters above ground level. In some cases, the intermediate camera features 506 may include an indication of these estimated heights for one or more features or objects. In some cases, the feature extractors 504 may also perform object detection. The feature extractors 504 may implicitly learn the real-world position over the ground level (e.g., the plane) for objects.

The intermediate camera features 506 may be combined 702 with a set of distance maps 704 to generate combined feature distance information. In some cases, the set of distance maps 704 may be representations of the distance map images described in conjunction with FIG. 6. In some cases, the intermediate camera features 506 may be combined 702 with a set of distance maps 704 by adding, multiplying, concatenating, applying attention mechanisms, etc. the distance maps 704 to the intermediate camera features 506.

In some cases, the combined feature distance information may be input to a feature height mapper 706. The feature height mapper 706 may be ML based. For example, the feature height mapper may be implemented as one or more neural networks (NN), convolutional network, or deep convolutional network, such as shown in FIG. 4. In some cases, the ML model of the feature height mapper 706 may associate certain features of the intermediate camera features 506 with height information (e.g., distance above the ground level, such as relative to a ground plane). For example, a transformation operation may learn that certain intermediate features of the intermediate camera features 506 (such as features that may describe a wheel) are typically located about half a meter above ground level (or ground plane).

As another example, the feature height mapper 706 may be trained to estimate a distance for intermediate camera features 506 based on the set of distance maps 704 and height information associated with the intermediate camera features 506. For example, the feature height mapper 706 may select a distance map from the set of distance maps 704 based on height information associated with a feature or object. Based on the selected distance map, the feature height mapper 706 may then map feature or object on the selected distance map to estimate a distance of the feature or object. A latent representation 708 illustrates depth map information for an image, as encoded by the feature height mapper 706. While shown as an image in this example, in some cases, the latent representation 708 may not be an image or directly representable as an image. For example, the depth information may be output as metadata, a bit-stream, or depth information may be output for less than all features or objects detected. In some examples, the latent representation 708 may include contain depth information, as well as information about the image features.

In some instances, one or more convolutional layers (e.g., operations) may be used to generate associations between intermediate features and the height information. In some cases, pooling layers may be used with various strides along with down sampling to help improve scale invariance. For example, pooling layers may help summarize features generated by convolutional layers for downsizing and pooling. Different strides settings can vary the amount of feature summarization, which can be useful when downsizing across various amounts.

The information represented by the latent representation 708 may be input to one or more transformation operations 710. In some cases, the one or more transformation operations 710 may be ML based. For example, each of the one or more transformation operations 710 may be implemented as one or more neural networks (NN), convolutional network, or deep convolutional network, such as shown in FIG. 4. The one or more transformation operations 710 may perform any of a variety of operations on the information represented by the latent representation 708 to generate output information for use by the vehicle. For example, the one or more transformation operations 710 may generate a segmented depth map 712 of the scene, generated a segmented BEV 714, or perform 3D object detection 716. In some cases, information represented by the latent representation 708 may not be generated. For example, operations of the feature height mapper 706 and transformation operations 710 may be combined to directly generate, as an example, a segmented BEV without generating intermediate depth information as illustrated by the latent representation 708. In some cases, generation of the information represented by the latent representation 708 may be reinforced by adding an auxiliary loss for the explicit depth prediction. The auxiliary loss for depth prediction may help improve depth estimation quality for use in subsequent operations, such as improving accuracy for a BEV or 3D object detection.

FIG. 8 is a flow diagram illustrating a process 800 for predicting distances of detected objects, in accordance with aspects of the present disclosure. The process 800 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device. In some cases, the computing device may be included with or a part of a system, such as the vehicle management system 200. The operations of the process 800 may be implemented as software components that are executed and run on one or more processors.

At block 802, the computing device (or component thereof) may obtain one or more images of an environment. In some cases, the one or more images are obtained from a monocular camera. In some cases, the one or more distance maps are based on camera properties of the monocular camera.

At block 804, the computing device (or component thereof) may generate a set of features for the one or more images. In some cases, the computing device may generate the depth information of the environment using a machine learning model.

At block 806, the computing device (or component thereof) may combine the set of features with one or more distance maps to generate combined feature distance information, wherein the one or more distance maps indicate distances based on relative height above a ground level. In some cases, the computing device may combine the set of features with one or more distance maps by concatenating or multiplying one or more values of the one or more distance maps to the set of features. In some cases, the computing device may select a distance map based on an estimated height of a feature of the set of features.

At block 808, the computing device (or component thereof) may generate depth information of the environment based on the combined feature distance information. At block 810, the computing device (or component thereof) may output the depth information of the environment. In some cases, the computing device may generate, based on the depth information of the environment, at least one of a segmented depth map of the environment, a segmented birds-eye-view (BEV) of the environment, or three-dimensional location information for one or more objects in the environment. In some cases, the computing device may perform a transformation operation based on the depth information of the environment and the set of features to generate a transformed set of features, and output the transformed set of features, wherein the depth information of the environment is output implicitly in the transformed set of features.

In some examples, the processes described herein (e.g., process 800 and/or other process described herein) may be performed by a computing device or apparatus (e.g., SOC 105). In another example, the process 800 may be performed by the vehicle 100 of FIG. 1A.

Figure 9:
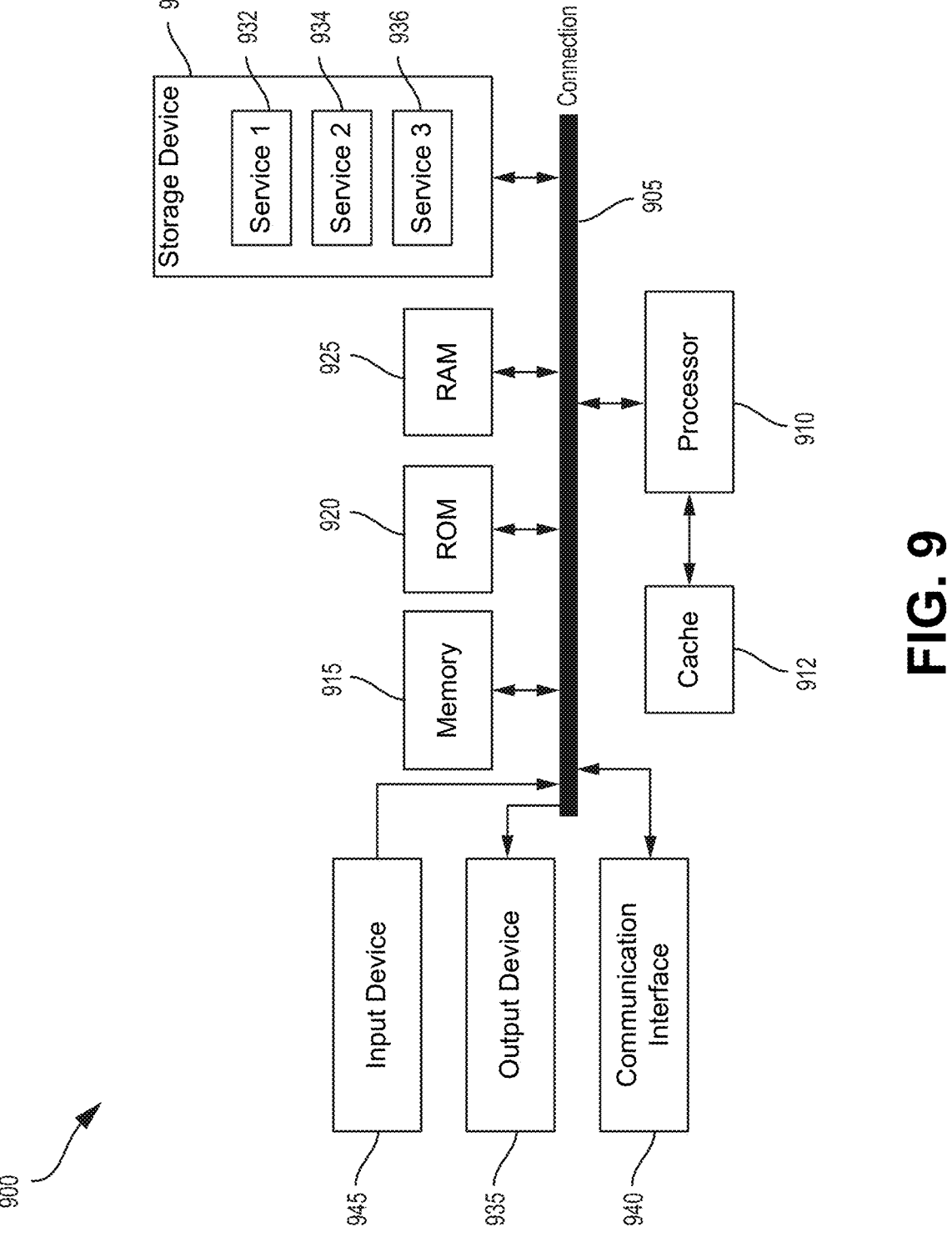
FIG. 9 illustrates an example computing device architecture of an example computing device which can implement techniques described herein.

FIG. 9 is a diagram illustrating an example of a system for implementing certain aspects of the present technology. In particular, FIG. 9 illustrates an example of computing system 900, which may be for example any computing device making up internal computing system, a remote computing system, a camera, or any component thereof in which the components of the system are in communication with each other using connection 905. Connection 905 may be a physical connection using a bus, or a direct connection into processor 910, such as in a chipset architecture. Connection 905 may also be a virtual connection, networked connection, or logical connection.

In some embodiments, computing system 900 is a distributed system in which the functions described in this disclosure may be distributed within a datacenter, multiple data centers, a peer network, etc. In some embodiments, one or more of the described system components represents many such components each performing some or all of the function for which the component is described. In some embodiments, the components may be physical or virtual devices.

Example system 900 includes at least one processing unit (CPU or processor) 910 and connection 905 that communicatively couples various system components including system memory 915, such as read-only memory (ROM) 920 and random access memory (RAM) 925 to processor 910. Computing system 900 may include a cache 912 of high-speed memory connected directly with, in close proximity to, or integrated as part of processor 910.

Processor 910 may include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which may represent any number of input mechanisms, such as a microphone for speech, a touch-sensitive screen for gesture or graphical input, keyboard, mouse, motion input, speech, etc. Computing system 900 may also include output device 935, which may be one or more of a number of output mechanisms. In some instances, multimodal systems may enable a user to provide multiple types of input/output to communicate with computing system 900.

Computing system 900 may include communications interface 940, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russiabased Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L#) cache), resistive random-access memory (RRAM/ReRAM), phase change memory (PCM), spin transfer torque RAM (STT-RAM), another memory chip or cartridge, and/or a combination thereof.

The storage device 930 may include software services, servers, services, etc., that when the code that defines such software is executed by the processor 910, it causes the system to perform a function. In some embodiments, a hardware service that performs a particular function may include the software component stored in a computer-readable medium in connection with the necessary hardware components, such as processor 910, connection 905, output device 935, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B.

Illustrative aspects of the disclosure include:

Aspect 1. An apparatus for generating depth information, comprising: at least one memory comprising instructions; and at least one processor coupled to the memory and configured to: obtain one or more images of an environment; generate a set of features for the one or more images; combine the set of features with one or more distance maps to generate combined feature distance information, wherein the one or more distance maps indicate distances based on relative height above a ground level; generate depth information of the environment based on the combined feature distance information; and output the depth information of the environment.

Aspect 2. The apparatus of claim 1, wherein the one or more images are obtained from a monocular camera.

Aspect 3. The apparatus of claim 2, wherein the one or more distance maps are based on camera properties of the monocular camera.

Aspect 4. The apparatus of claim 1, wherein the at least one processor is further configured to generate the depth information of the environment using a machine learning model.

Aspect 5. The apparatus of claim 1, wherein the at least one processor is further configured to combine the set of features with one or more distance maps by concatenating or multiplying one or more values of the one or more distance maps to the set of features.

Aspect 6. The apparatus of claim 1, wherein the at least one processor is further configured to select a distance map based on an estimated height of a feature of the set of features.

Aspect 7. The apparatus of claim 1, wherein the at least one processor is further configured to generate, based on the depth information of the environment, at least one of a segmented depth map of the environment, a segmented birds-eye-view (BEV) of the environment, or three-dimensional location information for one or more objects in the environment.

Aspect 8. The apparatus of claim 1, wherein the at least one processor is further configured to: perform a transformation operation based on the depth information of the environment and the set of features to generate a transformed set of features; and output the transformed set of features, wherein the depth information of the environment is output implicitly in the transformed set of features.

Aspect 9. A method for generating depth information, comprising: obtaining one or more images of an environment; generating a set of features for the one or more images; combining the set of features with one or more distance maps to generate combined feature distance information, wherein the one or more distance maps indicate distances based on relative height above a ground level; generating depth information of the environment based on the combined feature distance information; and outputting the depth information of the environment.

Aspect 10. The method of claim 9, wherein the one or more images are obtained from a monocular camera.

Aspect 11. The method of claim 10, wherein the one or more distance maps are based on camera properties of the monocular camera.

Aspect 12. The method of claim 9, further comprising generating the depth information of the environment using a machine learning model.

Aspect 13. The method of claim 9, further comprising combining the set of features with one or more distance maps by concatenating or multiplying one or more values of the one or more distance maps to the set of features.

Aspect 14. The method of claim 9, further comprising selecting a distance map based on an estimated height of a feature of the set of features.

Aspect 15. The method of claim 9, further comprising generating, based on the depth information of the environment, at least one of a segmented depth map of the environment, a segmented birds-eye-view (BEV) of the environment, or three-dimensional location information for one or more objects in the environment.

Aspect 16. The method of claim 9, further comprising: performing a transformation operation based on the depth information of the environment and the set of features to generate a transformed set of features; and outputting the transformed set of features, wherein the depth information of the environment is output implicitly in the transformed set of features.

Aspect 17. A non-transitory computer-readable medium having stored thereon instructions that, when executed by one or more processors, cause the at least one or more processors to: obtain one or more images of an environment; generate a set of features for the one or more images; combine the set of features with one or more distance maps to generate combined feature distance information, wherein the one or more distance maps indicate distances based on relative height above a ground level; generate depth information of the environment based on the combined feature distance information; and output the depth information of the environment.

Aspect 18. The non-transitory computer-readable medium of claim 17, wherein the one or more images are obtained from a monocular camera.

Aspect 19. The non-transitory computer-readable medium of claim 18, wherein the one or more distance maps are based on camera properties of the monocular camera.

Aspect 20. The non-transitory computer-readable medium of claim 17, wherein instructions further cause the at least one processor to generate the depth information of the environment using a machine learning model.

Aspect 21. The non-transitory computer-readable medium of claim 17, wherein instructions further cause the at least one processor to combine the set of features with one or more distance maps by concatenating or multiplying one or more values of the one or more distance maps to the set of features.

Aspect 22. The non-transitory computer-readable medium of claim 17, wherein instructions further cause the at least one processor to select a distance map based on an estimated height of a feature of the set of features.

Aspect 23. The non-transitory computer-readable medium of claim 17, wherein instructions further cause the at least one processor to generate, based on the depth information of the environment, at least one of a segmented depth map of the environment, a segmented birds-eye-view (BEV) of the environment, or three-dimensional location information for one or more objects in the environment.

Aspect 24. The non-transitory computer-readable medium of claim 17, wherein instructions further cause the at least least one processor to: perform a transformation operation based on the depth information of the environment and the set of features to generate a transformed set of features; and output the transformed set of features, wherein the depth information of the environment is output implicitly in the transformed set of features.

Aspect 25. An apparatus for generating depth information comprising: means for obtaining one or more images of an environment; means for generating a set of features for the one or more images; means for combining the set of features with one or more distance maps to generate combined feature distance information, wherein the one or more distance maps indicate distances based on relative height above a ground level; means for generating depth information of the environment based on the combined feature distance information; and means for outputting the depth information of the environment.

Aspect 26. The apparatus of claim 25, wherein the one or more images are obtained from a monocular camera.

Aspect 27. The apparatus of claim 26, wherein the one or more distance maps are based on camera properties of the monocular camera.

Aspect 28. The apparatus of claim 26, further comprising means for generating the depth information of the environment using a machine learning model.

Aspect 29. The apparatus of claim 26, further comprising means for combining the set of features with one or more distance maps by concatenating or multiplying one or more values of the one or more distance maps to the set of features.

Aspect 30. The apparatus of claim 26, further comprising means for selecting a distance map based on an estimated height of a feature of the set of features.

Aspect 31. The apparatus of claim 26, further comprising means for generating, based on the depth information of the environment, at least one of a segmented depth map of the environment, a segmented birds-eye-view (BEV) of the environment, or three-dimensional location information for one or more objects in the environment.

Aspect 32. The apparatus of claim 26, further comprising: means for performing a transformation operation based on the depth information of the environment and the set of features to generate a transformed set of features; and means for outputting the transformed set of features, wherein the depth information of the environment is output implicitly in the transformed set of features.

What is claimed is:

1. An apparatus for generating depth information, comprising:
   at least one memory comprising instructions; and
   at least one processor coupled to the at least one memory and configured to:
       obtain one or more images of an environment;
       generate a set of features for the one or more images;
       combine the set of features with one or more distance maps to generate combined feature distance information, wherein the one or more distance maps indicate distances based on a height of features above a ground plane in the one or more images, and wherein the one or more distance maps are predetermined;
       generate depth information of the environment based on the combined feature distance information; and
       output the depth information of the environment.

2. The apparatus of claim 1, wherein the one or more images are obtained from a monocular camera.

3. The apparatus of claim 2, wherein the one or more distance maps are based on camera properties of the monocular camera.

4. The apparatus of claim 1, wherein the at least one processor is further configured to generate the depth information of the environment using a machine learning model.

5. The apparatus of claim 1, wherein the at least one processor is further configured to combine the set of features with one or more distance maps by concatenating or multiplying one or more values of the one or more distance maps to the set of features.

6. The apparatus of claim 1, wherein the at least one processor is further configured to select a distance map based on an estimated height of a feature of the set of features.

7. The apparatus of claim 1, wherein the at least one processor is further configured to generate, based on the depth information of the environment, at least one of a segmented depth map of the environment, a segmented birds-eye-view (BEV) of the environment, or three-dimensional location information for one or more objects in the environment.

8. The apparatus of claim 1, wherein the at least one processor is further configured to:

perform a transformation operation based on the depth information of the environment and the set of features to generate a transformed set of features; and output the transformed set of features, wherein the depth information of the environment is output implicitly in the transformed set of features.

9. A method for generating depth information, comprising:

obtaining one or more images of an environment;

generating a set of features for the one or more images;

combining the set of features with one or more distance maps to generate combined feature distance information, wherein the one or more distance maps indicate distances based on a height of features above a ground plane in the one or more images, and wherein the one or more distance maps are predetermined;

generating depth information of the environment based on the combined feature distance information; and outputting the depth information of the environment.

10. The method of claim 9, wherein the one or more images are obtained from a monocular camera.

11. The method of claim 10, wherein the one or more distance maps are based on camera properties of the monocular camera.

12. The method of claim 9, further comprising generating the depth information of the environment using a machine learning model.

13. The method of claim 9, further comprising combining the set of features with one or more distance maps by concatenating or multiplying one or more values of the one or more distance maps to the set of features.

14. The method of claim 9, further comprising selecting a distance map based on an estimated height of a feature of the set of features.

15. The method of claim 9, further comprising generating, based on the depth information of the environment, at least one of a segmented depth map of the environment, a segmented birds-eye-view (BEV) of the environment, or three-dimensional location information for one or more objects in the environment.

16. The method of claim 9, further comprising:

performing a transformation operation based on the depth information of the environment and the set of features to generate a transformed set of features; and outputting the transformed set of features, wherein the depth information of the environment is output implicitly in the transformed set of features.

17. A non-transitory computer-readable medium having stored thereon instructions that, when executed by at least one processor, cause the at least one processor to:

obtain one or more images of an environment;

generate a set of features for the one or more images;

combine the set of features with one or more distance maps to generate combined feature distance information, wherein the one or more distance maps indicate distances based on a height of features above a ground plane in the one or more images, and wherein the one or more distance maps are predetermined;

generate depth information of the environment based on the combined feature distance information; and output the depth information of the environment.

18. The non-transitory computer-readable medium of claim 17, wherein the one or more images are obtained from a monocular camera.

19. The non-transitory computer-readable medium of claim 18, wherein the one or more distance maps are based on camera properties of the monocular camera.

20. The non-transitory computer-readable medium of claim 17, wherein instructions further cause the at least one processor to generate the depth information of the environment using a machine learning model.

21. The non-transitory computer-readable medium of claim 17, wherein instructions further cause the at least one processor to combine the set of features with one or more distance maps by concatenating or multiplying one or more values of the one or more distance maps to the set of features.

22. The non-transitory computer-readable medium of claim 17, wherein instructions further cause the at least one processor to select a distance map based on an estimated height of a feature of the set of features.

23. The non-transitory computer-readable medium of claim 17, wherein instructions further cause the at least one processor to generate, based on the depth information of the environment, at least one of a segmented depth map of the environment, a segmented birds-eye-view (BEV) of the environment, or three-dimensional location information for one or more objects in the environment.

24. The non-transitory computer-readable medium of claim 17, wherein instructions further cause the at least one processor to:

perform a transformation operation based on the depth information of the environment and the set of features to generate a transformed set of features; and output the transformed set of features, wherein the depth information of the environment is output implicitly in the transformed set of features.

25. An apparatus for generating depth information comprising:

means for obtaining one or more images of an environment;

means for generating a set of features for the one or more images;

means for combining the set of features with one or more distance maps to generate combined feature distance information, wherein the one or more distance maps indicate distances based on a height of features above a ground plane in the one or more images, and wherein the one or more distance maps are predetermined;

means for generating depth information of the environment based on the combined feature distance information; and means for outputting the depth information of the environment.

26. The apparatus of claim 25, wherein the one or more images are obtained from a monocular camera.

27. The apparatus of claim 26, wherein the one or more distance maps are based on camera properties of the monocular camera.

28. The apparatus of claim 26, further comprising means for generating the depth information of the environment using a machine learning model.

29. The apparatus of claim 26, further comprising means for combining the set of features with one or more distance maps by concatenating or multiplying one or more values of the one or more distance maps to the set of features.

30. The apparatus of claim 1, wherein the locations of the features in the one or more images comprise a distance of a feature from a bottom or a top of an image.

\* \* \* \* \*